US008107471B2

(12) United States Patent
Nakamura et al.

(10) Patent No.: US 8,107,471 B2
(45) Date of Patent: Jan. 31, 2012

(54) COMMUNICATION SYSTEM, SERVER, CONTROL APPARATUS AND COMMUNICATION APPARATUS

(75) Inventors: Hitomi Nakamura, Kokubunji (JP); Norihisa Matsumoto, Fuchu (JP); Takehiro Morishige, Kawasaki (JP); Naruhito Nakahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 277 days.

(21) Appl. No.: 12/073,767

(22) Filed: Mar. 10, 2008

(65) Prior Publication Data

US 2008/0310334 A1  Dec. 18, 2008

(30) Foreign Application Priority Data

Jun. 15, 2007 (JP) ................................. 2007-158151

(51) Int. Cl.
*H04L 12/28* (2006.01)
*H04L 12/56* (2006.01)
(52) U.S. Cl. ......................... 370/389; 370/401; 709/226
(58) Field of Classification Search .......... 370/229–236, 370/344, 347–352, 356, 357, 395.2, 395.21, 370/395.3, 395.31, 445, 389, 395.32, 400, 370/401, 471, 474, 475, 492
See application file for complete search history.

(56) References Cited

U.S. PATENT DOCUMENTS

| 7,061,880 | B2 * | 6/2006 | Basilier ........................ 370/312 |
| 7,113,484 | B1 * | 9/2006 | Chapman et al. ............. 370/252 |
| 7,212,527 | B2 * | 5/2007 | Shah et al .................... 370/389 |
| 7,336,604 | B2 * | 2/2008 | Dong et al. ................... 370/230 |
| 7,436,766 | B2 * | 10/2008 | Alfano et al. ................. 370/230 |
| 7,466,719 | B2 * | 12/2008 | Xu et al. ....................... 370/465 |
| 2003/0026211 | A1 * | 2/2003 | Xu et al. ....................... 370/252 |
| 2004/0162909 | A1 * | 8/2004 | Choe et al. .................... 709/230 |
| 2007/0121542 | A1 * | 5/2007 | Lohr et al. ..................... 370/329 |

OTHER PUBLICATIONS

"IP Multimedia Subsystem—Stage 2", All-IP Core Network Multimedia Domain, $3^{rd}$ Generation Partnership Project 2, Version 0.3, Aug. 2006, pp. i-x and 11-190.

(Continued)

*Primary Examiner* — Kevin C Harper
*Assistant Examiner* — Samina Choudhry
(74) *Attorney, Agent, or Firm* — Crowell & Moring LLP

(57) ABSTRACT

Disclosed herewith is a communication system, which can solve the following conventional problem that if packets exchanged between a terminal and an HA are encapsulated with use of the mobile IPv6 protocol, the PDSN cannot identify any IP flows in the mobile IPv6 tunnel. Consequently, there is no QoS usable appropriately to the services in the EV-D0 RAN. To solve such a problem, the PCRF notifies the HA of the filter information used to specify each IP flow and the flow label assigned to each IP flow. The HA then sets the flow label in the outer IPv6 header of the packet matching with the filter information and transfers the packet to the object unit. The PDSN then refers to the flow label set in the outer IPv6 header to identify the object IP flow in the mobile IPv6 tunnel. Consequently, a proper QoS can be usable for the services respectively in the EV-D0 RAN.

4 Claims, 25 Drawing Sheets

OTHER PUBLICATIONS

"IP Multimedia Call Control Protocol Based on SIP and SDP Stage 3", All-IP Core Network Multimedia Domain, $3^{rd}$ Generation Partnership Project 2, Version 0.06, Jul. 2006, pp. i-ix and 1-290.

"Service Based Bearer Control—Stage 2", All-IP Core Network Multimedia Domain, $3^{rd}$ Generation Partnership Project 2, Version 1.0 (Draft Version 0.21. , pp. i-v and 1-41.

"Service Based Bearer Control—Tx Interface Stage 3", All-IP Core Network Multimedia Domain, $3^{rd}$ Generation Partnership Project 2, Version 1.0 (Draft Version 0.11), pp. i-v and 1-47.

"Service Based Bearer Control—Ty Interface Stage 3", $3^{rd}$ Generation Partnership Project 2, Version 1.0 , Feb. 2006, pp. i-vi and 1-46.

"cdma2000 Wireless IP Network Standard: Quality of Service and Header Reduction", All-IP Core Network Multimedia Domain, $3^{rd}$ Generation Partnership Project 2, Version 1.0 (Draft Version 0.11), , pp. i-v and 1-66.

D. Johnson et al., Mobility Support in IPv6, Network working Group, Standards Track, Jun. 2004, pp. 1-165.

* cited by examiner

FIG. 3

70 — SERVICE TABLE (PCRF12)

| SERVICE SESSION ID | FLOW INFORMATION | | | | | | |
|---|---|---|---|---|---|---|---|
| | FLOW ID (72a) | FLOW FILTER (72b) | DIREC-TION (72c) | TYPE (72d) | BAND WIDTH (72e) | CODEC (72f) | ... |
| ax10d @AF | 1001 | FROM 3ffe::22 8002 TO 3ffe::21 7066 | IN | AUDIO | 9.6kb/s | EVRC | 70a |
| | 1002 | FROM 3ffe::21 7552 TO 3ffe::22 8016 | OUT | AUDIO | 9.6kb/s | EVRC | 70b |
| | 1003 | FROM 3ffe::22 8004 TO 3ffe::21 7124 | IN | VIDEO | 20kb/s | H263 | 70c |
| ... | | | | | | | |
| | | | | | | | |

※ DIRECTION 72c MEANS "IN" = REVERSE AND "OUT" = FORWARD IN DIRECTION

FIG. 4

80 — PPP SESSION TABLE (PCRF12)

| PPP SESSION ID | TERMINAL IP ADDRESS | BEARER INFORMATION ||||||  |
|---|---|---|---|---|---|---|---|---|
| | | 83a | 83b | 83c | 83d | 83e | 83f | |
| | | BEARER ID | USAGE | PRIO-RITY | BAND WIDTH | FLOW LABEL | STATUS | ... |
| dx6f@ PDSN21a | 3ffe:1 ::21 | 5001 | AUDIO/ EVRC | HIGH | 10 kb/s | 112 | ACTIVE | ~80a |
| | | 5002 | VIDEO/ H.263 | HIGH | 20 kb/s | 113 | ACTIVE | ~80b |
| | | 5003 | STREAMING/ MPEG2 | MID | 10 Mb/s | 114 | ACTIVE | ~80c |
| | | 5004 | OTHERS | LOW | 10 Mb/s | 115 | ACTIVE | ~80d |
| ... | | | | | | | | |
| | | | | | | | | |

FIG. 5

90 — MOBILE IP TABLE (PCRF12)

| MOBILE ID | HoA | CoA | EXPIRES | ... |
|---|---|---|---|---|
| 6b5a@HA13 | 3ffe::21 | 3ffe:1::21 | 60s | |
| ... | | | | |
| | | | | |

100 — ENCAPSULATION RULE TABLE (PCRF12)

| SOURCE | | | | ENCAPSULATION RULE | | | | |
|---|---|---|---|---|---|---|---|---|
| 101a | 101b | 101c | 101d | 102a | 102b | 102c | 102d | |
| FLOW ID | MOBILE ID | PPP SESSION ID | BEARER ID | FLOW FILTER | CoA | FLOW LABEL | EXPIRES | ... |
| 1001 | 6b5a@HA13 | dx6f@PDSN21a | 5001 | FROM 3ffe::22 8002 TO 3ffe::21 7066 | 3ffe:1::21 | 112 | — | — 100a |
| 1003 | 6b5a@HA13 | dx6f@PDSN21a | 5002 | FROM 3ffe::22 8004 TO 3ffe::21 7124 | 3ffe:1::21 | 113 | — | — 100b |
| ... | | | | | | | | |
| | | | | | | | | |

FIG. 7A

110 — DECAPSULATION RULE TABLE (PCRF12)

| SOURCE | | | DECAPSULATION RULE | | | |
|---|---|---|---|---|---|---|
| FLOW ID | MOBILE ID | PPP SESSION ID | FLOW FILTER | TRAFFIC CLASS | EXPI-RES | ... |
| 1002 | 6b5a@HA13 | dx6f@PDSN21a | FROM 3ffe::21 7552 TO 3ffe::22 8016 | 01 | – | |
| ... | | | | | | |

111a 111b 111c 112a 112b 112c

111 — SOURCE, 112 — DECAPSULATION RULE, 100a

FIG. 7B

120 — FLOW TYPE-TRAFFIC CLASS MAPPING TABLE (PCRF12)

| FLOW TYPE | TRAFFIC CLASS |
|---|---|
| AUDIO | 01 |
| VIDEO | 02 |
| ... | |

130 — MOBILE IP TABLE (HA13)

| MOBILE ID | HoA | CoA | EXPIRES | ENCAP. RULE IDs | DECAP. RULE IDs | ... |
|---|---|---|---|---|---|---|
| 6b5a | 3ffe::21 | 3ffe:1::21 | 60s | 601, 602... | 701... | |
| ... | | | | | | |
| | | | | | | |

140 — ENCAPSULATION RULE TABLE (HA13)

| ENCAP. RULE ID | FLOW FILTER | CoA | FLOW LABEL | EXPIRES | ... |
|---|---|---|---|---|---|
| 601 | FROM 3ffe::22 8002 TO 3ffe::21 7066 | 3ffe:1 ::21 | 112 | – |  | ← 140a
| 602 | FROM 3ffe::22 8004 TO 3ffe::21 7124 | 3ffe:1 ::21 | 113 | – |  | ← 140b
| ... |  |  |  |  |  |

FIG. 9B

150 — DECAPSULATION RULE TABLE (HA13)

| DECAP. RULE ID | FLOW FILTER | TRAFFIC CLASS | EXPIRES | ... |
|---|---|---|---|---|
| 701 | FROM 3ffe::21 7552 TO 3ffe::22 8016 | 01 | – |  | ← 150a
| ... |  |  |  |  |

FIG. 24

420 — PPP SESSION TABLE (PDSN21(a, b))

| PPP SESSION ID (421) | TERMINAL IP ADDRESS (422) | BEARER INFORMATION (423) ||||| |
|---|---|---|---|---|---|---|---|
| | | USAGE (423a) | PRIO- RITY (423b) | BAND WIDTH (423c) | TFT (423d) | STATUS (423e) | ... |
| dx6f | 3ffe:1 ::21 | AUDIO/ EVRC | HIGH | 10 kb/s | FROM 3ffe:1::1 TO 3ffe:1::21 FLOW LABEL=112 | ACTIVE | ← 420a |
| | | VIDEO/ H.263 | HIGH | 20 kb/s | FROM 3ffe:1::1 TO 3ffe:1::21 FLOW LABEL=113 | ACTIVE | ← 420b |
| | | STREA- MING/ MPEG2 | MID | 10 Mb/s | FROM 3ffe:1::1 TO 3ffe:1::21 FLOW LABEL=114 | ACTIVE | ← 420c |
| | | OTHERS | LOW | 10 Mb/s | FROM 3ffe:1::1 TO 3ffe:1::21 FLOW LABEL=115 | ACTIVE | ← 420d |
| ... | | | | | | | |
| | | | | | | | |

FIG. 25

440 — QoS PROFILE TABLE (PCRF12)

| PPP SESSION ID (441) | TERMINAL IP ADDRESS (442) | QoS PROFILE (443) | | | | |
|---|---|---|---|---|---|---|
| | | USAGE (443a) | PRIORITY (443b) | BAND WIDTH (443c) | ... | |
| dx6f@ PDSN21a | 3ffe:1 ::21 | AUDIO/ EVRC | HIGH | 10 kb/s | | 440a |
| | | VIDEO/ H. 263 | HIGH | 20 kb/s | | 440b |
| | | STREA- MING/ MPEG2 | MID | 10 Mb/s | | 440c |
| | | OTHERS | LOW | 10 Mb/s | | 440d |
| ... | | | | | | |
| | | | | | | |

COMMUNICATION SYSTEM, SERVER, CONTROL APPARATUS AND COMMUNICATION APPARATUS

CLAIM OF PRIORITY

The present application claims priority from Japanese application JP 2007-158151 filed on Jun. 15, 2007, the content of which is hereby incorporated by reference into this application.

FIELD OF THE INVENTION

The present invention relates to a communication system that controls the QoS of an access network by linking the control with service controls. More particularly, the present invention relates to a mobile communication system that controls mobile communications with use of the mobile IPv6 protocol.

BACKGROUND OF THE INVENTION

The mobile IPv6 (refer to IETF RFC3775, Mobility Support in IPv6) is a protocol that enables communications even during moving from a network to another with use of the same IP address. The mobile IPv6 protocol uses networks, each of which includes a mobile node (MN) that enables communications during moving among plural networks, a home agent (HA) that manages position information of the MN, and a correspondent node (CN) that communicates with the MN. The MN registers the correspondence (binding information) between each IP address (HoA: Home Address) and each IP address (CoA: Care of Address) periodically in the HA. The (HoA: Home Address) is never changed even during moving among plural networks and the (CoA: Care of Address) is assigned dynamically at each destination network. The HA catches IP packets addressed to the HoA from the CN and encapsulates the IP packets with use of the IPv6 header in which its address is set as the source address and the CoA of the MN is set as the destination address. The HA then transfers the encapsulated IP packets to the MN. The MN decapsulates the packets received from the HA and processes the packet data. On the other hand, as for the packets addressed to the CN from the MN, the MN encapsulates those packets with use of the IPv6 header in which the MN address is set as the source address and the HA is set as the destination address, then transfers the encapsulated packets to the HA. The HA decapsulates the received packets and transfers the packet data to the CN. This is why the communications are enabled with use of the same IP address even during moving among plural networks.

There is a third generation (3G) mobile communication system standardized with the 3GPP2 ($3^{rd}$ Generation Partnership Project 2). The system is regarded as an example of the communication system that uses the mobile IPv6 protocol.

The 3G mobile communication system consists of a radio access network (RAN) and a core network. The RAN has functions used to terminate and control radio transmission functions. The core network has functions used to control movements and services. The core network includes an access gateway (PDSN: Packet Data Serving Node) and an HA. The PDSN is connected to the MN with use of the PPP, thereby supplying IP connecting functions. The core network supplies IP communication functions on the basis of the mobile IP.

On the other hand, the 3GPP2 standardizes a service control network connected to the core network as an MMD (Multimedia Domain) (3GPP2 X. P0013-002-B v0.3, All-IP Core Network Multimedia Domain; IP Multimedia Subsystem Stage2 and 3GPP2 X. P0013-004-B v0.06, All-IP Core Network Multimedia Domain; IP Multimedia Call Control Protocol Based on SIP and SDP Stage3). The MMD uses the SIP (Session Initiation Protocol)/(SDP (Session Description Protocol) as a control protocol employable for telephones and IM (Instant Messaging) services.

Furthermore, the 3GPP2 specifies a method for the cooperation between the service based bearer control (SBBC) used to control the MMD services and the RAN QoS so as to make QoS control appropriately to each object service (3GPP2 X. P0013-012-B v0.21, All-IP Core Network Multimedia Domain; Service Based Bearer Control—Stage2; 3GPP2 X. P0013-013-0 v0.11, All-IP Core Network Multimedia Domain; Service Based Bearer Control Tx Interface Stage3; 3GPP2 X. P0013-014-0 v0.11, All-IP Core Network Multimedia Domain; Service Based Bearer Control Ty Interface Stage3). The SBBC includes a QoS policy server (PCRF: Policy and Charging Rules Server) disposed between the MMD service control server (AS: Application Server) and the access network. The AS notifies the PCRF of the service information (communication address, port No., codec, band width, etc.) obtained upon processing such a service control protocol as the SIP/SDP or the like. The PCRF determines the object QoS according to the service information notified from the AS and notifies the RAN of the determined QoS through the PDSN.

The RAN controls the QoS appropriately to each application program according to the QoS parameters determined by the PCRF (3GPP2 X. P0011-004-D v1.0, cdma2000 Wireless IP Network Standard: Quality of Service and Header Reduction). For example, the RAN uses a communication channel secured for a fixed bandwidth and with less delay and jittering to send voice traffics that are often sent in real time. On the other hand, the RAN uses a best effort communication channel to send IM and Web services.

In the RAN, each IP flow that belongs to each application program is specified with filter information (source/destination IP address, port No., etc.) referred to as a TFT (Traffic Flow Template). Each of the MN and the PDSN manages the correspondence between TFT and communication channel to transfer IP flows through a proper communication channel. Each terminal transfers packets in the reverse direction matching with the TFT through the communication channel corresponding to the TFT. The PDSN carries out the same processings for the packets transferred in the forward direction.

SUMMARY OF THE INVENTION

As described above, in case of the conventional communication system, each of the MN and the PDSN use the TFT to identify each IP flow and employs a proper QoS for the IP flow in the RAN. This makes it possible for the conventional communication system to operate with no problems when the terminal uses the simple IP or mobile IPv4 protocol.

If the terminal uses the mobile IPv6 protocol, however, all the packets transferred between the terminal and the HA are encapsulated with use of the common IPv6 header. Thus the PDSN cannot identify any packet IP flows in the forward direction. Consequently, in the RAN, the QoS cannot be determined appropriately to any packets in the forward direction. This has been a problem.

Under such circumstances, it is an object of the present invention to enable the PDSN to identify each packet IP flow in the forward direction and employ an appropriate QoS to each service type in the RAN even when the mobile IPv6 protocol is employed to encapsulate packets.

In order to solve the above conventional problems, the present invention notifies the HA of the filter information that enables the PCRF to specify such an IP flow belonging to an object service, as well as an ID assigned to each IP flow as described above. And the HA, upon transferring a packet matching with the filter information, sets the ID in the outer header of the encapsulated packet while the PDSN refers to the ID set in the outer header to identify the service type and to employ a proper QoS for the service type.

According to the present invention, therefore, even when the mobile IPv6 protocol is employed, the PDSN identifies each IP flow in the forward direction and the RAN can use a proper QoS for the specified service type.

BRIEF DESCRIPTION OF THE DRAWINGS

FIG. 3 is a configuration example of a service table included in the PCRF 12;

FIG. 4 is a configuration example of a PPP session table included in the PCRF 12;

FIG. 5 is a configuration example of a mobile IP table included in the PCRF 12;

FIG. 6 is a configuration example of an encapsulation rule table included in the PCRF 12;

FIG. 7A is a configuration example of a decapsulation rule table included in the PCRF 12;

FIG. 7B is a configuration example of a flow type-traffic class mapping table included in the PCRF 12;

FIG. 8 is a configuration example of a mobile IP table included in the HA 13;

FIG. 9A is a configuration example of an encapsulation rule table included in the HA 13;

FIG. 9B is a configuration example of a decapsulation rule table included in the HA 13;

FIG. 24 is a configuration example of a PPP session table included in the PDSN (21a, 21b); and FIG. 25 is a configuration example of a QoS profile table included in the PCRF 12.

DETAILED DESCRIPTION OF THE PREFERRED EMBODIMENTS

In a preferred embodiment of the present invention, the HA sets an ID in the field of Flow Label or Traffic Class of the outer IPv6 header. In this case, in the TFT field are set HA as the source IP address and MN CoA as the destination IP address. And the ID is set as a flow label or traffic class. The HA may also set the ID in the SPI (Security Parameter Index) field of the IPsec ESP/AH header. In this case, in the TFT field are set HA as the source IP address, MN CoA as the destination IP address, and the ID as the SPI respectively.

In case of a communication system in which a terminal takes the initiative in setting of the RAN communication channel, the PCRF may receive the QoS information of the communication channel and the ID from the PDSN and select a communication channel appropriately to the object IP flow according to the QoS information, then assign the selected communication channel ID to the IP flow, and notify the HA of the ID.

On the other hand, in case of a communication system in which a network takes the initiative in setting of the RAN communication channel, the PCRF may determine both QoS and ID to be assigned to the object IP flow according to the service information notified from an AF (Application Function) of an SIP server or the like, then notify the HA and the PDSN of the determined QoS and ID respectively. In this case, the PDSN sets both the RAN communication channel and the TFT according to the QoS information and the ID notified from the PCRF. Hereunder, there will be described an embodiment of the present invention with reference to the accompanying drawings.

First Embodiment

In this first embodiment of the present invention, it is premised that a terminal takes the initiative in setting the subject RAN communication channel.

Figure 1:
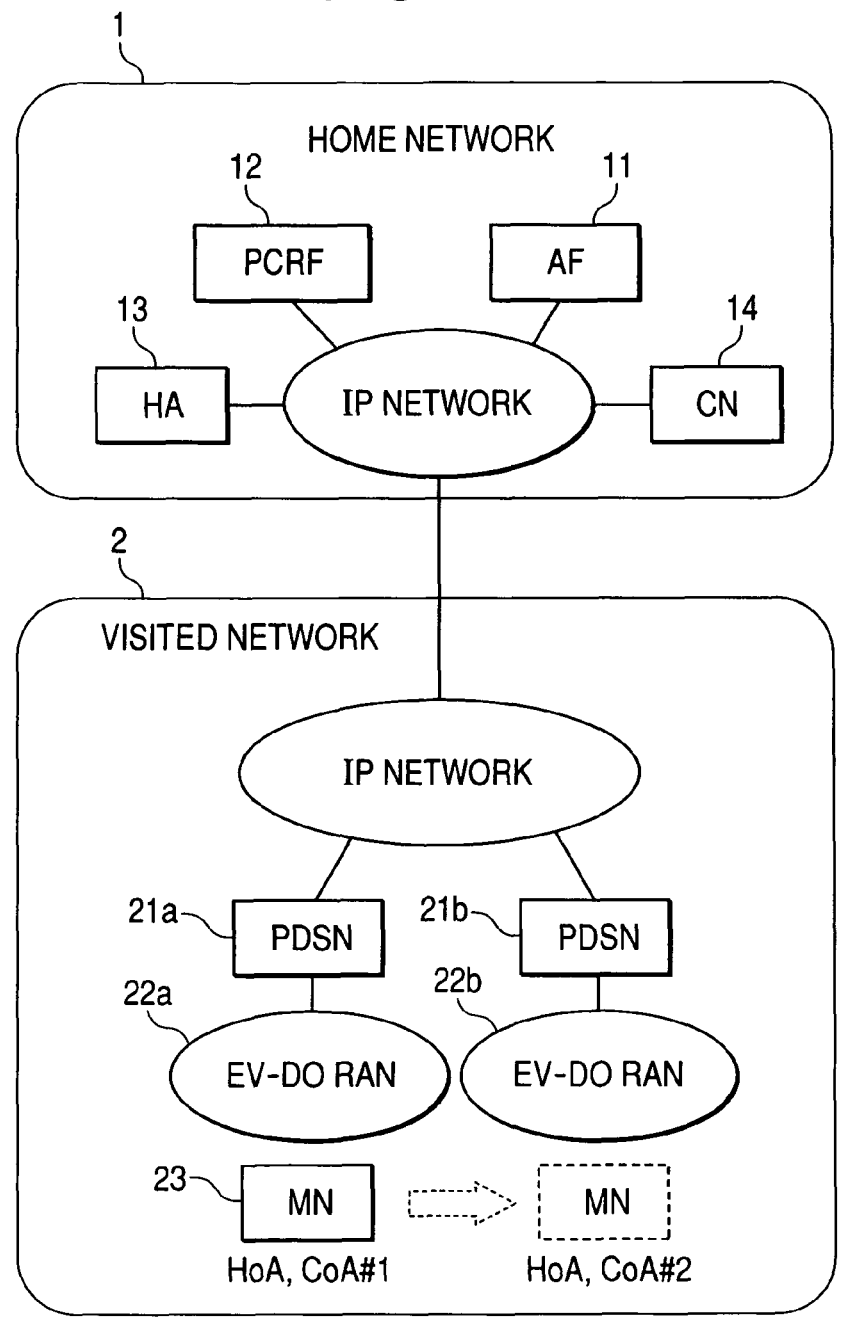
FIG. 1 is a configuration example of a communication network in the first and second embodiments of the present invention.

FIG. 1 shows a configuration example of a communication system of the present invention. The communication system consists of a home network 1 and a visited network 2. The home network 1 is connected to an AF 11 that controls services, a PCRF 12 that controls the QoS of the RAN, an HA 13 that controls mobile IPv6 communications, and a CN 14. The visited network 2 is connected to a PDSN (21a, 21b), an EV-D0 RAN (22a, 22b), and an MN 23, respectively.

Figure 2A:
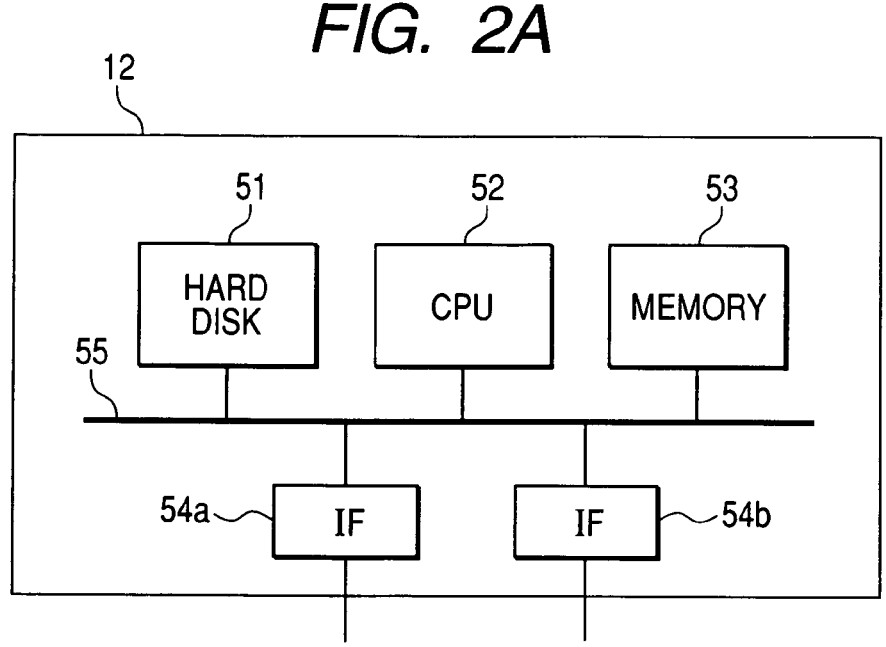
FIG. 2A is a unit configuration of a PCRF 12.

FIG. 2A shows a unit configuration of the PCRF 12. The PCRF 12 consists of a hard disk 51, a CPU 52, a memory 53, and an IF (54a, 54b). Those components of the PCRF 12 are connected to each another through a bus 55. Programs used to execute the functions of the PCRF 12 are stored in the memory 53 and the CPU 52 reads those programs sequentially to execute those functions.

The PCRF 12 manages a service table 70 shown in FIG. 3, a PPP session table 80 shown in FIG. 4, a mobile IP table 90 shown in FIG. 5, an encapsulation rule table 100 shown in FIG. 6, and a decapsulation rule table 110 shown in FIG. 7A. Those tables are stored in the memory 53 or in the hard disk 51.

The service table 70 shown in FIG. 3 manages the service information notified from the AF 11. The service table 70 consists of fields of Service Session ID 71 used to identify an AF and a service session and Flow Information 72 belonging to each service session. The Flow Information 72 field consists of fields of Flow ID 72a used to identify uniquely each flow in the PCRF 12, Flow Filter 72b (filter information) used to specify a flow, Direction 72c (flow direction), Type 72d (flow type), Bandwidth 72e (flow bandwidth), CODEC 72f (codec information), etc. In the filter information (Flow Filter 72b) are set, for example, a source address, a destination address, a port number, etc. In the setting examples (70a, 70b, and 70c) of the service table 70 are denoted information of an audio flow in the bi-direction and a video flow in the "out" (reverse) direction in the same service session. Such way, plural flows can be set for one service session in the service table 70. With such a table configuration, the communication comes to able to cope with plural flows flexibly in one service session.

The PPP session table 80 shown in FIG. 4 manages the PPP session information notified from the PDSN (21a, 21b). The PPP session table 80 consists of fields of PPP Session ID 81 used to identify uniquely a PDSN and a PPP session, Terminal IP Address 82, and Bearer Information 83. In this embodiment, the "Bearer" means a communication channel of the RAN (21a, 21b), which has a specific QoS attribute. As described in the BACKGROUND OF THE INVENTION, the PDSN (21a, 21b) manages the correspondence between each RAN communication channel (bearer) and each TFT. In this embodiment, the PDSN (21a, 21b) sets a unique flow label for each bearer in the TFT so as to enable a proper IP flow to be assigned to each bearer in the mobile IPv6 tunnel. The PCRF 12, which includes the PPP session table 80, has come to manage the correspondence between each flow label and each bearer QoS attribute. The flow label may also be replaced with the Traffic Class field in the IPv6 header, the SPI in the IPsec ESP/AH header, etc.

The Bearer Information 83 consists of fields of Bearer ID 83a used to identify uniquely each bearer in the PCRF 12, Usage 83b (bearer usage), Priority 83c (priority level), Bandwidth 83d (secured bandwidth), Flow Label 83e (flow label assigned to each bearer), and Status 83f (bearer status). In the setting examples (80a to 80d) of the bearer table 80 are denoted information of the bearers belonging to the same PPP session. Such way, information of plural bearers can be set for one PPP session in the bearer table 80. With such a table configuration, the communication has come to cope flexibly with plural bearers set for one PPP session.

The mobile IP table 90 shown in FIG. 5 manages the binding information of both the HoA and the CoA notified to the PCRF 12 from the HA 13. The mobile IP table 90 consists of fields of Mobile ID 91 used to identify uniquely an HA and its binding information, HoA 92 (home address) and CoA 93 (care of address), and Expires 94 (expiration of the subject rule).

The encapsulation rule table 100 shown in FIG. 6 manages the encapsulation rule applied to the packet encapsulation by the HA 13. The encapsulation rule is generated by the PCRF 12 and set in the HA 13. The encapsulation rule table 100 consists of fields of Source 101 (a pointer to rule-related information) and Encapsulation Rule 102. In the fields (101a, 101b, 101c, and 101d) of the Source 101 are set a flow ID 72a, mobile ID 91, PPP session ID 81, and bearer ID 83a related to the encapsulation rule respectively. In the encapsulation rule 102 are set information items of Flow Filter 012a (filter information used to identify each flow uniquely), CoA 102b (care of address), Flow Label 102c, and Expires 102d (expiration of the subject rule).

The decapsulation rule table 110 shown in FIG. 7A manages the decapsulation rule applied to the packet decapsulation by the HA 13. The encapsulation rule is generated by the PCRF 12 and set in the HA 13. The decapsulation rule table 110 consists of fields of Source 111 (a pointer to the rule-related information) and Decapsulation Rule 112. In the fields of 111a, 111b, and 111c of the Source 111 are set information items of Flow ID 72a, Mobile ID 91, and PPP Session ID 81 related to the decapsulation rule respectively. In the field of the Decapsulation Rule 112 are set information items of Traffic Class 112b and Expires 11c (the expiration of the subject rule).

Figure 2B:
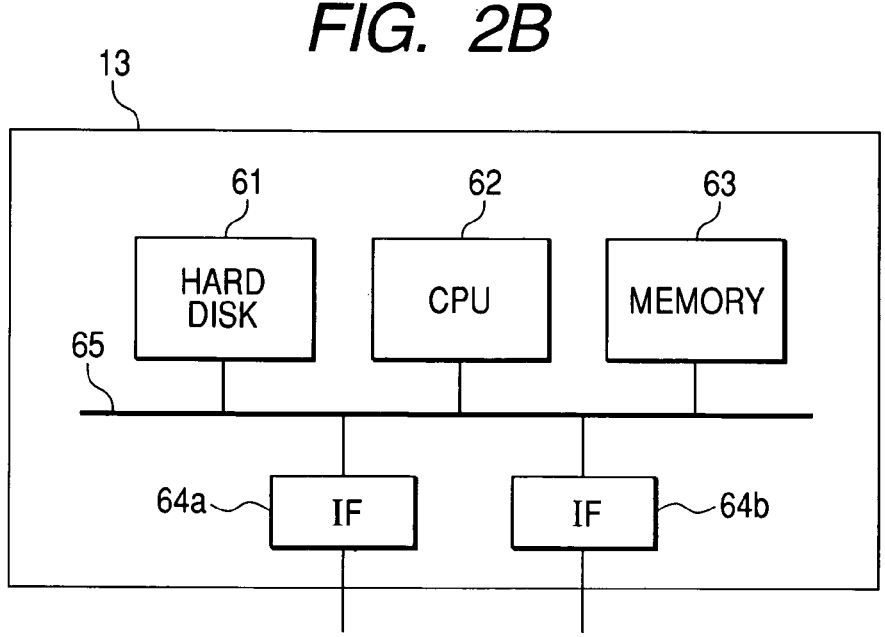
FIG. 2B is a unit configuration of an HA 13.

FIG. 2B shows a unit configuration of the HA 13. The HA 13 consists of a hard disk 61, a CPU 62, a memory 83, and an IF (64a, 64b). Those components of the HA 13 are connected to each another through a bus 65. The programs used to execute the functions of the HA 13 are stored in the memory 63 and the CPU 62 reads those programs sequentially to execute the functions of the HA 13.

The HA 13 manages the mobile IP table shown in FIG. 8, the encapsulation rule table 140 shown in FIG. 9A, and the decapsulation rule table 150 shown in FIG. 9B respectively. Those tables are stored in the memory 63 or in the hard disk 61.

The mobile IP table 130 shown in FIG. 8 manages the binding information of both the HoA and the CoA to be registered by the MN 23 in the HA 13. The mobile IP table 130 consists of fields of Mobile ID 131 used to identify the binding information, HoA 132 (home address), CoA 133 (care of address), Expires 134 (expiration of the subject information), Encap. Rule IDs 135 (a pointer to the related encapsulation rule), and Decap. Rule IDs 136 (a pointer to the related decapsulation rule). The fields of Encap. Rule IDs 135 and Decap. Rule IDs 136 held in the table 130 such way makes it faster to search the encapsulation and decapsulation rules.

The encapsulation rule table 140 shown in FIG. 9A manages the encapsulation rule notified to the HA 13 from the PCRF 12. In the encapsulation rule table 140, information items are set in the fields of Encap. Rule ID 141 (used to identify each rule), Flow Filter 142 (filter information used to identify each flow uniquely), CoA 143 (care of address set for encapsulation), Flow Level 144, and Expires 145 (expiration of the subject rule).

The decapsulation rule table 150 shown in FIG. 9B manages the decapsulation rule notified to the HA 13 from the PCRF 12. In the decapsulation rule table 150, information items are in the fields of Decap. Rule ID 151 (used to identify the subject rule), Flow Filter 152 (used to identify each flow uniquely), Traffic Class 153 (a traffic class to be set after decapsulation), and Expires 154 (expiration of the subject rule).

Figure 23:
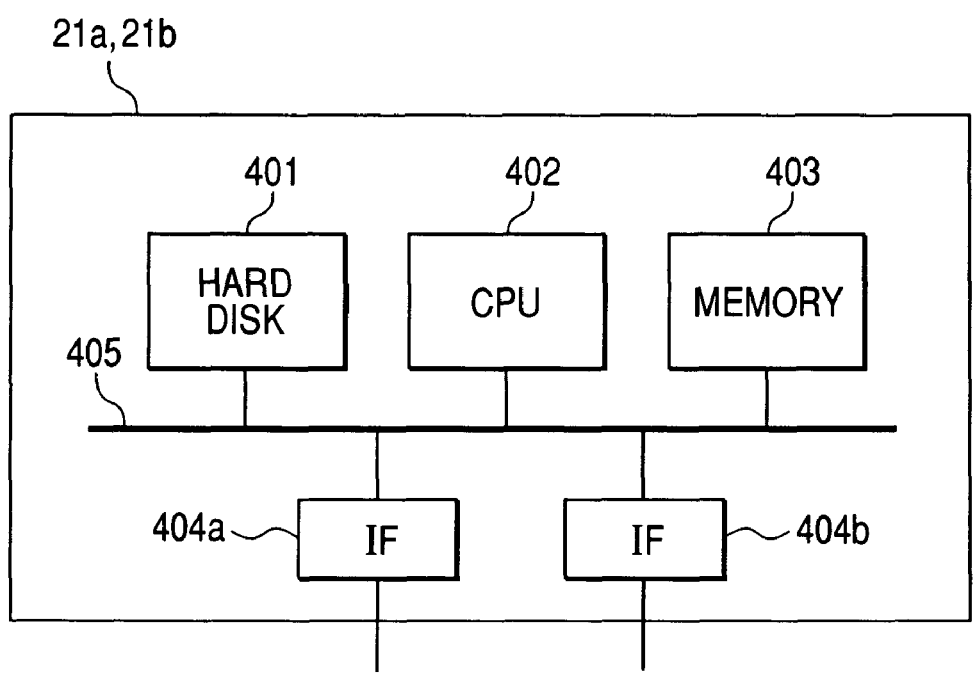
FIG. 23 is a configuration example of the PDSN (21a, 21b)

FIG. 23 shows a unit configuration of the PDSN (21a, 21b) Each PDSN (21a, 21b) consists of a hard disk 401, a CPU 402, a memory 403, and an IF (404a, 404b). Those components of the PDSN (21a, 21b) are connected to each another through a bus 405. The programs used to execute the functions of the PDSN (21a, 21b) are stored in the memory 403 and the CPU 402 reads those programs sequentially to execute the functions of the PDSN (21a, 21b).

FIG. 24 shows a configuration of the PPP session table 420 stored in the memory 403 or in the hard disk 401 of the PDSN (21a, 21b). The PPP session table 420 consists of fields of PPP Session ID 421 (used to identify uniquely each PPP session in the PDSN (21a, 21b)), Terminal IP Address 422, and Bearer Information 423. The Bearer Information 423 consists of fields of Usage 423a (bearer usage), Priority 423b (priority level), Bandwidth 423c (secured bandwidth), TFT 423d (filter information), and Status 423e (bearer status).

As shown in the setting examples (420a to 420d) of the PPP session table 420, in this embodiment, a source IP address, a destination IP address, and a flow label are set as filter information (TFT 423d). The PDSN (21, 21b) manages the PPP session table 420 to manage the correspondence between each bearer and each items of filter information effectively.

Figure 10:
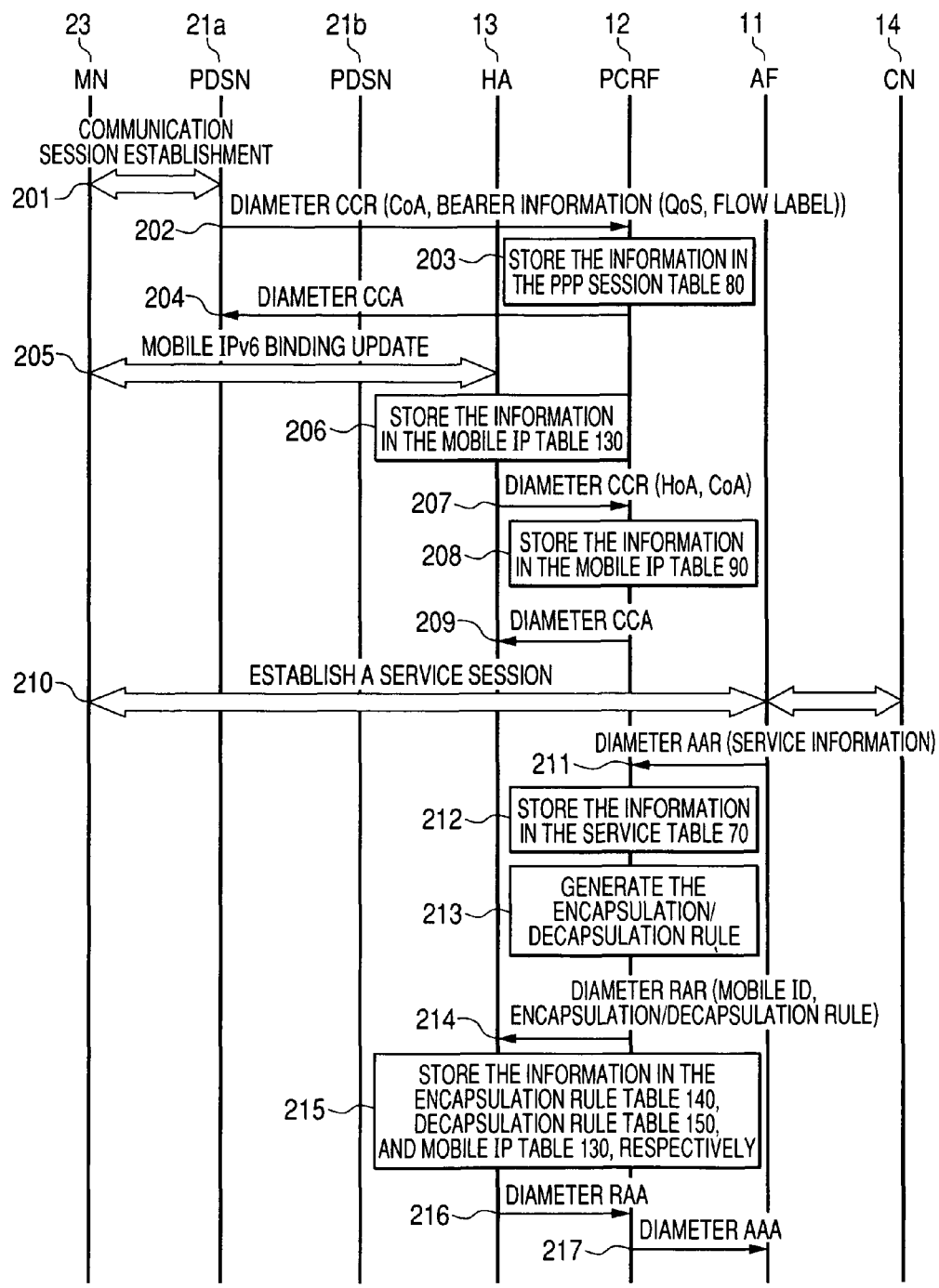
FIG. 10 is a sequence of terminal connection/service session establishment in the first embodiment.

FIG. 10 shows details of a sequence required to establish a service session after the MN 23 is connected to the EV-D0 RAN 22a. Hereunder, there will be described this sequence in detail.

In steps 201 to 209, the sequence is established when the MN 23 is connected to the EV-D0 RAN 22a. At first, the MN 23 connects the EV-D0 RAN 22a to establish a PPP session with respect to the PDSN 21a and set a bearer and a TFT respectively (S201). In this step, the PPP session table 420 of the PDSN 21a is set. In this embodiment, the IP address of the HA 13 is set as the source address of the TFT 423d, the CoA of the MN 23 is set as the destination address. Furthermore, a different value is set for each bearer in the Flow Label field of the TFT 423d.

After that, the PDSN 21a sends a diameter CCR to the PCRF 12 (S202) to notify the IP address (CoA) assigned to the object terminal and the bearer information established by the terminal. The bearer information notified here includes at least a flow label value assigned to each bearer and the QoS information of the bearer. In a preferable example, a character string denoting the usage of the bearer, priority level, secured bandwidth, bearer status, etc. are set as such bearer QoS information. The PCRF 12 stores the notified information in the PPP session table 80 (S203). The PCRF 12 then returns a diameter CCA (S204) to the PDSN 21a.

After that, the MN 23 registers the binding information of both the HoA and the CoA in the HA 13 (S205). The HA 13 stores this information in the mobile IP table 130 and sends a diameter CCR to the PCRF 12 (S207) to notify the binding information. The PCRF 12 stores the binding information notified from the HA 13 in the mobile IP table 90 (S208) and returns a diameter CCA to the HA 13 (S209) as a response.

The processings in steps 210 to 217 are executed to establish a sequence that begins a service session. At first, the MN 23 establishes a service session to communicate with the CN 14 through the AF 11 (S210). The AF 11 notifies the PCRF 12 of the service information extracted from a service control signal (SIP/SDP or the like) (S211). The PCRF 12 stores the notified information in the service table 70 (S212) and generates a capsulation/decapsulation rule corresponding to this service information (S213). Hereunder, there will be described how the PCRF 12 generates the capsulation/decapsulation rule (S213) in detail with reference to FIGS. 11 and 12.

Figure 11:
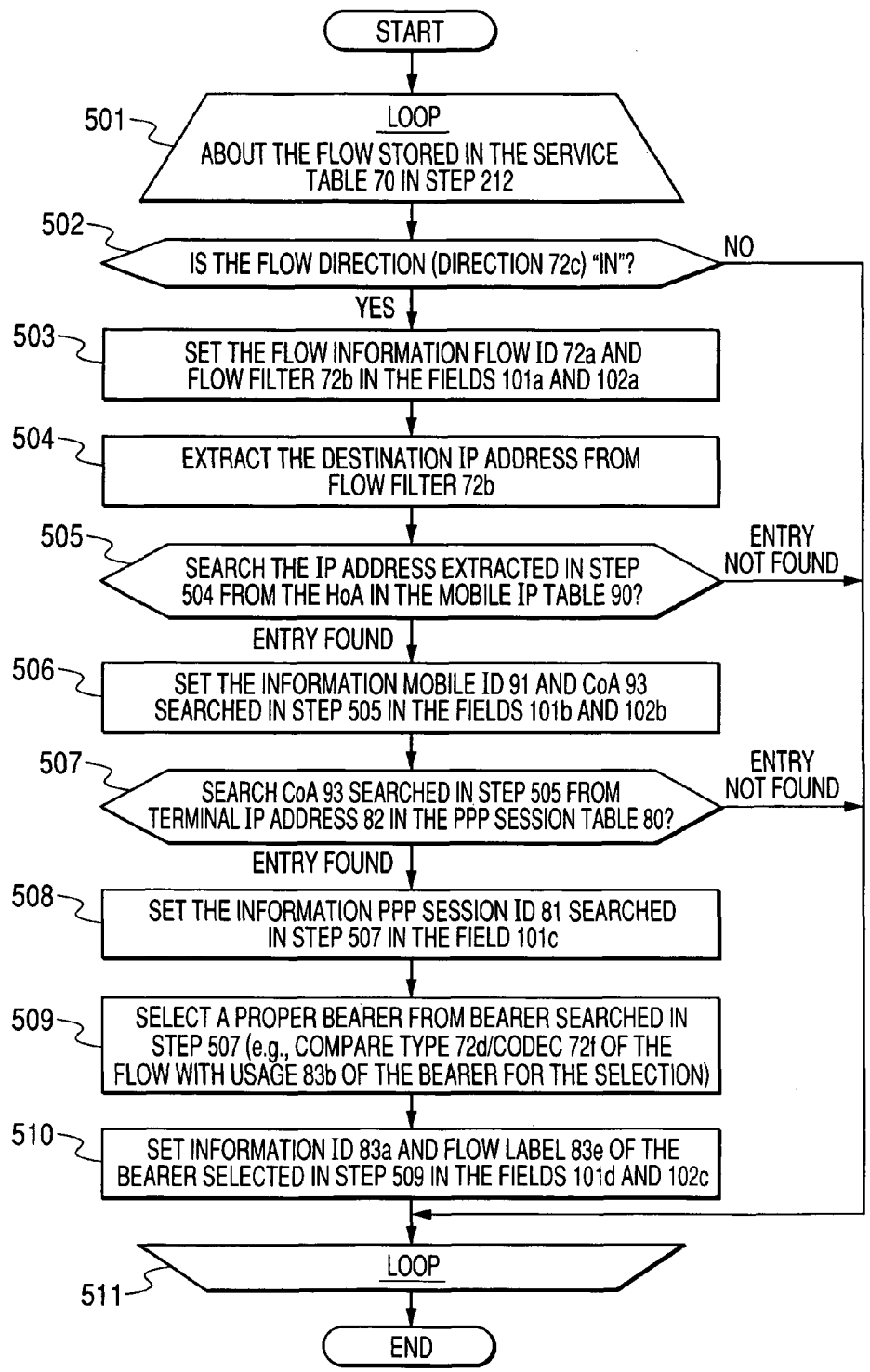
FIG. 11 is a diagram that describes an encapsulation rule generation routine executed in the PCRF 12.

FIG. 11 shows processings for generating the rule of capsulation by the PCRF 12. In this case, loop processing steps 501 to 511 are executed for a flow stored in the service table 70 in step 212 shown in FIG. 10. At first, the PCRF 12 checks if the flow direction (Direction 72c) is "in" or not (S502). If not "in", the PCRF 12 exits the flow processing. If the flow direction is "in", the PCRF 12 sets necessary information (set in the fields of Flow ID 72a and Flow Filter 72b) in the fields 101a and 102a of the encapsulation rule table 100 respectively (S503). Furthermore, the PCRF 12 extracts the destination IP address from the field of Flow Filter 72b (S504). Then, the PCRF 12 searches the extracted IP address from the field of HoA 92 of the mobile IP table 90 (S505). If the corresponding entry is not found in the field, the PCRF 12 exits the flow processing. If the corresponding entry is found, the PCRF 12 sets necessary information (set in the fields of Mobile ID 91 and CoA 93) in the fields 101b and 102b of the encapsulation rule table 100 respectively (S506). Then, the PCRF 12 searches the CoA 93 of the entry searched in step 505 from the field of Terminal IP Address 82 in the PPP session table 80 (S507). If the object entry is not found in the field, the PCRF 12 exits the flow processing. If the object entry is found in the field, the PCRF 12 sets the PPP Session ID 81 in the field 101c of the encapsulation rule table 100 (S508). Furthermore, the PCRF 12 selects a proper bearer for the subject flow from among those of the entry searched in step 507. This bearer may also be selected, for example, by comparing the Type 72d, Bandwidth 72e, Codec 72f, etc. of the flow with the Usage 83b, Priority 83c, Bandwidth 83d, etc. of the bearer. Then, the PCRF 12 sets the Bearer ID 83a and Flow Label 83e of the bearer selected in step 509 in the fields 101d and 102c of the encapsulation rule table 100 (S510). Since the PCRF 12 includes the encapsulation rule table 100, the PCRF 12 comes to be able to assign a proper flow label (a bearer having a proper QoS attribute) to each flow. Furthermore, the PCRF 12 has also come to manage the correspondence between each mobile IP session and each IP flow.

Figure 12:
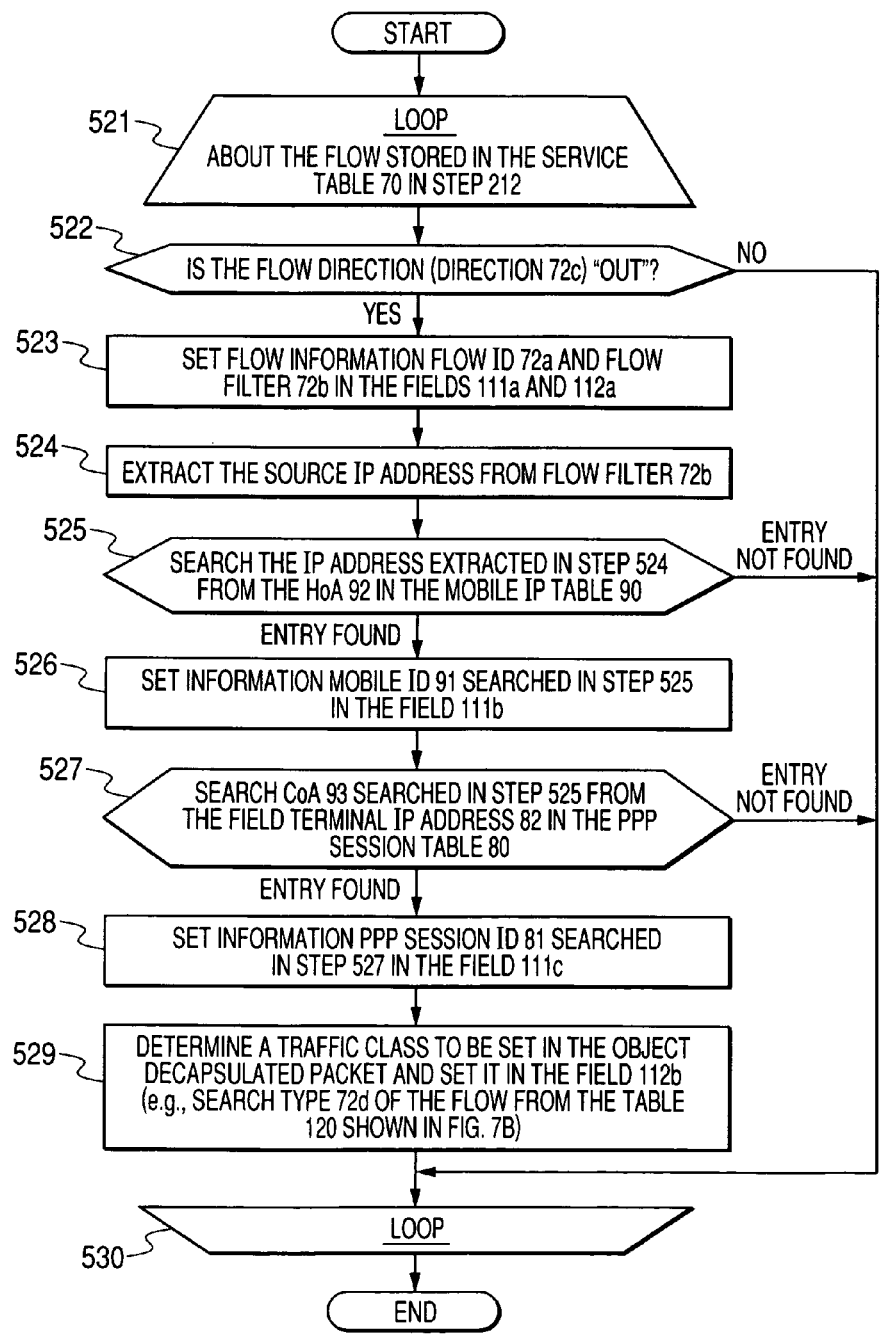
FIG. 12 is a diagram that describes a decapsulation rule generation routine executed in the PCRF 12.

FIG. 12 shows a flowchart of the procedure that generates the rule of decapsulation by the PCRF 12. In this procedure, the PCRF 12 executes the loop processings in steps 521 to 530 with respect to a flow stored in the service table 70 in step 212 shown in FIG. 10. At first, the PCRF 12 checks if the flow direction (Direction 72c) is "out" or not (S522). If not "out", the PCRF 12 exits the flow processing. If the flow direction is "out", the PCRF 12 sets necessary information (set in the fields of Flow ID 72a and Flow Filter 72b) with respect to the subject flow in the fields 111a and 112a of the decapsulation rule table 110 respectively (S523). Furthermore, the PCRF 12 extracts the source IP address from the field of Flow Filter 72b (S524). Then, the PCRF 12 searches the extracted IP address from the field of HoA 92 in the mobile IP table 90 (S525). If the object entry is not found in the field, the PCRF 12 exits the flow processing. If the object entry is found, the PCRF 12 sets necessary information (set in the field of Mobile ID 91) in the fields 111b of the decapsulation rule table 110 (S526). Then, the PCRF 12 searches the CoA 93 of the entry searched in step 525 from the field of Terminal IP Address 82 in the PPP session table 80 (S527). If the object entry is not found in the field, the PCRF 12 exits the flow processing. If the object entry is found in the field, the PCRF 12 sets necessary information (set in the field of PPP Session ID 81) of the entry searched in step 527 in the field 111c of the decapsulation rule table 110 (S528). Furthermore, the PCRF 12 determines a traffic class to be set in the decapsulated packet and sets the determined traffic class in the field 112b of the decapsulation rule table 110 (S529). The PCRD 12 may manage the mapping table including both Flow Type and Traffic Class shown in FIG. 7B and refer to the table upon determining a traffic class. Due to the decapsulation rule table 110 included in itself, the PCRF 12 comes to able to assign a proper traffic class required to control the QoS in the home network 1 to each flow. Furthermore, the PCRF 12 comes also to be able to manage the correspondence among each PPP session, each mobile IP session, and each IP flow.

Return to FIG. 10 to continue the description of the above sequence. The PCRF 12 sends a diameter RAR to the HA 13 (S214) to notify the capsulation/decapsulation rule generated in step 213 by relating the rule to the mobile ID (101b, 111b).

The HA 13 then stores the notified rule in the encapsulation rule table 140, the decapsulation rule table 150, and the mobile IP table 130 respectively (S215) and returns a diameter RAA (S216) to the PCRF 12 as a response to the diameter AAR (S211). This completes the description of the procedure executed when a service session is established.

Figure 13:
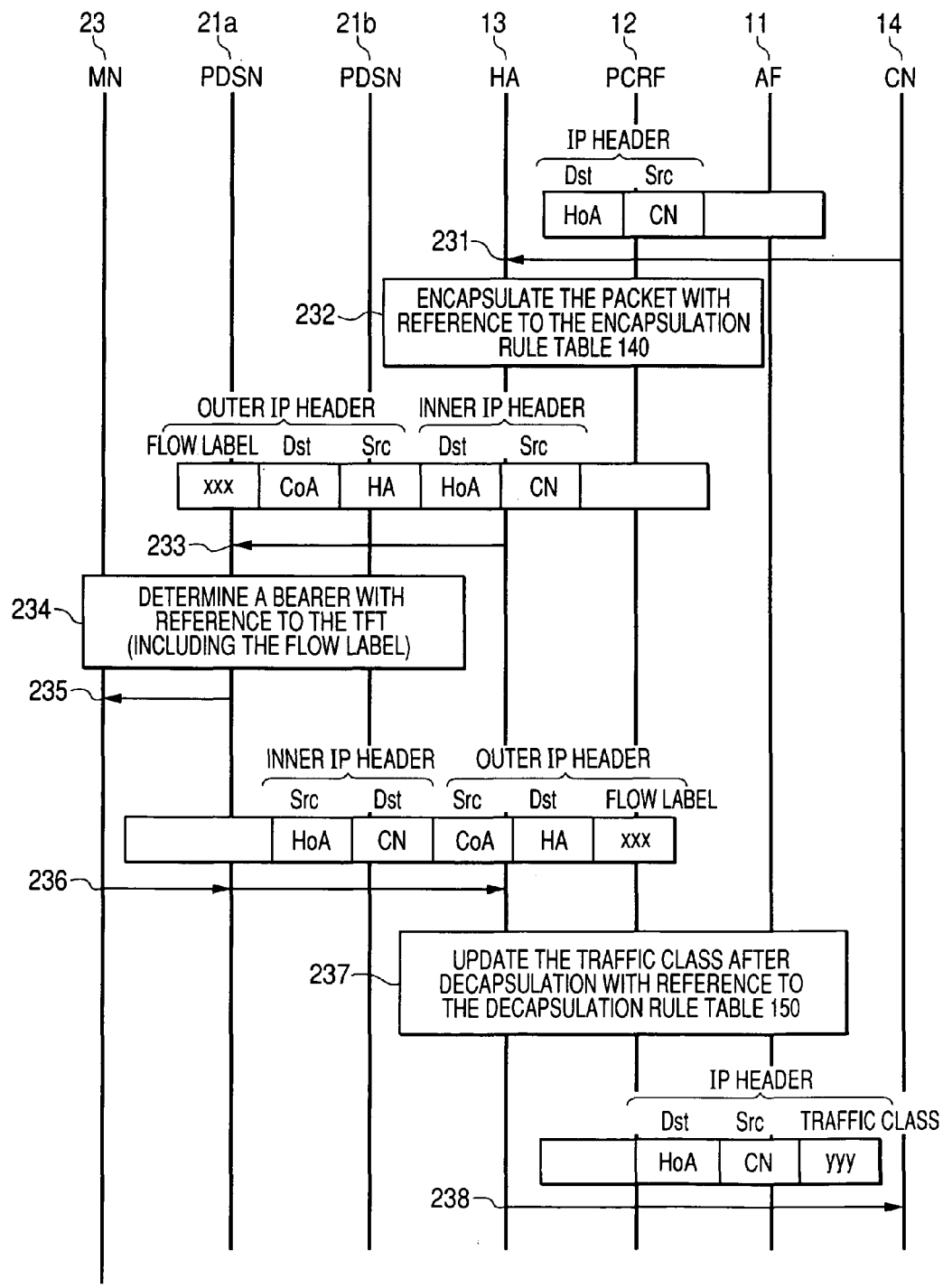
FIG. 13 is a sequence of a packet transfer between MN 23 and CN 14 in the first embodiment.

Next, there will be described how packets are exchanged between MN 23 and CN 14 with reference to FIG. 13. Processings in steps 231 to 235 are executed to send a packet from the CN 14 to the MN 23. At first, the CN 14 sends a packet to the MN 23 (S231). In the packet are set HoA as the source address and its own address as the destination address (S231). The HA 13 then catches and encapsulates the packet with use of the IPv6 header (S232). The HA 13 then sets itself (HA) as the source address after the encapsulation. Furthermore, the HA 13 sets the destination address (CoA of the MN 23) and the flow label by referring to the encapsulation rule table 140. After this, the HA transfers the encapsulated packet to the PDSN 21*a* (S233). The PDSN 21*a* then compares the filter information (TFT 423*d*) in the PPP session table 420 with the flow label and destination/source IP address included in the packet header region to determine a bearer to be used (S234), then transfers the packet to the MN 23 (S235).

Figure 14:
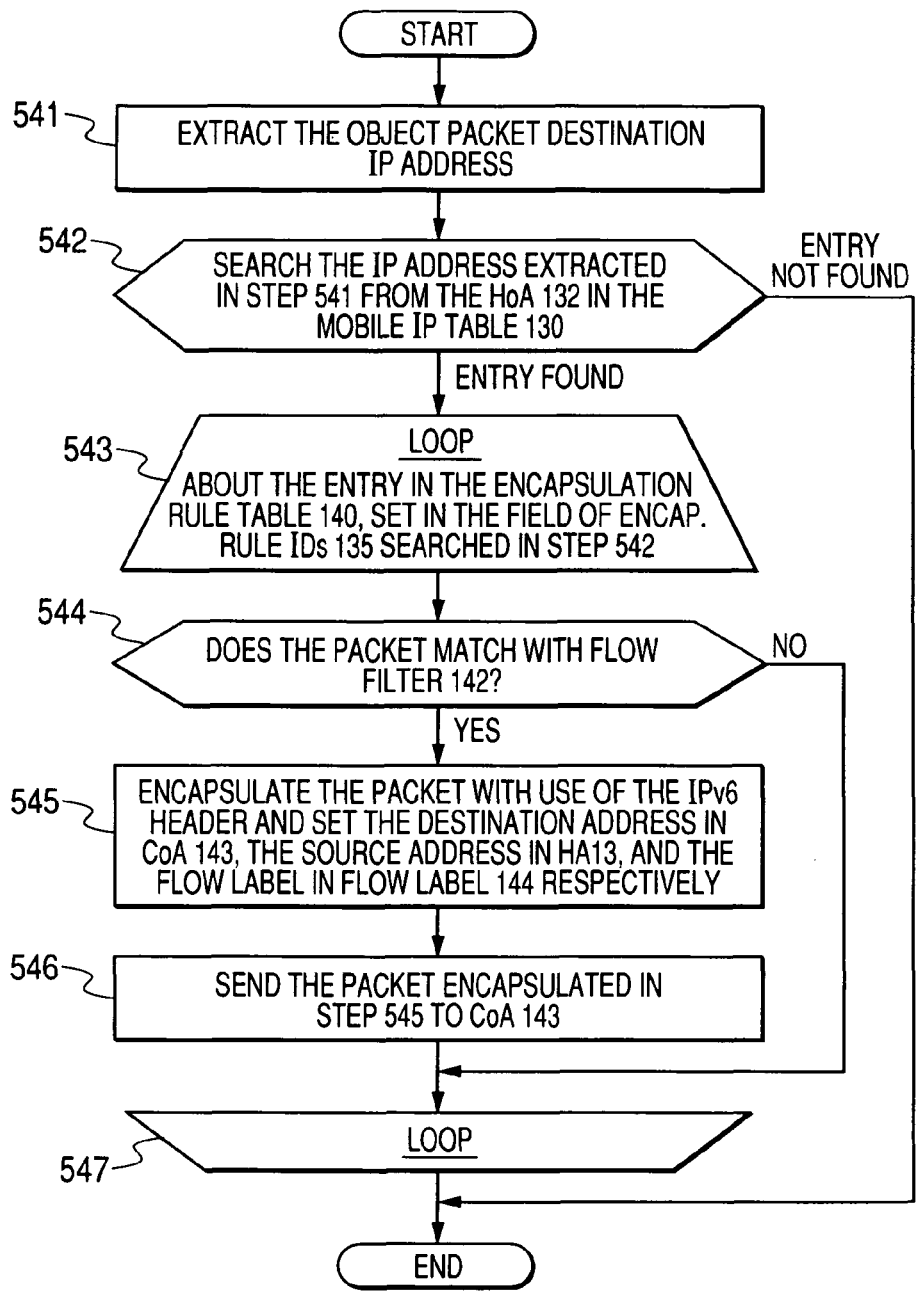
FIG. 14 is a diagram that describes a packet encapsulation routine executed in the HA 13.

Next, there will be described how HA 13 encapsulates packets in detail (S232) with reference to FIG. 14. At first, the HA 13 extracts the destination IP address of the packet (S541). Then, the HA 13 searches the IP address extracted in step 541 from the HoA 132 in the mobile IP table 130 (S542). If the object entry is not found, the HA 13 exits the processing. If the object entry is found, the HA 13 executes the processings in loop steps 543 to 547 for the entry in the encapsulation rule table 140, denoted by the Encap. Rule IDs 135 of the entry searched in step 542. At first, the HA 13 checks if the packet matches with the Flow Filter 142 (S544). This check is made by comparing the information set in the Flow Filter 142 with the source/destination address and port number included in the packet header region. If not matching, the HA 13 exits the processing with respect to the encapsulation rule. If matching, the HA 13 encapsulates the packet with use of the IPv6 header and sets the CoA 143 as the destination address, HA 13 as the source address, and Flow Label 144 as the flow label respectively (S545). Then, the HA 13 sends the encapsulated packet to the CoA 143 (S546). If there is no Flow Filter 142 matching with that of the packet in loop steps 543 to 547, the HA 13 may set the CoA 133 of the entry searched in step 542 as the destination address, the HA 13 as the source address, and a preset default value (e.g., 0) as the flow label after the encapsulation respectively, then transfer the packet to the CoA 133. The HA 13 may also discard the packet at this time.

Return to FIG. 13. Next, there will be described a procedure that sends packets from the MN 23 to the CN 14 (steps 236 to 238). At first, the MN 23 encapsulates a packet addressed to the CN 14 and sends the packet to the CN 14 (S236). At this time, CN 14 is set as the destination address and HoA of the MN 23 is set as the source address before encapsulation. And after encapsulation, HA 13 is set as the destination address and CoA of the MN 23 is set as the source address. Thus the packet 236 arrives at the HA 13 through the PDSN 21*a*. The HA 13, upon receiving the packet 236, takes out the outer IPv6 header from the packet. Then, the HA 13 refers to the decapsulation rule table 150 to set the traffic class (S237) and transfers the packet to the CN 14 (S238).

Figure 15:
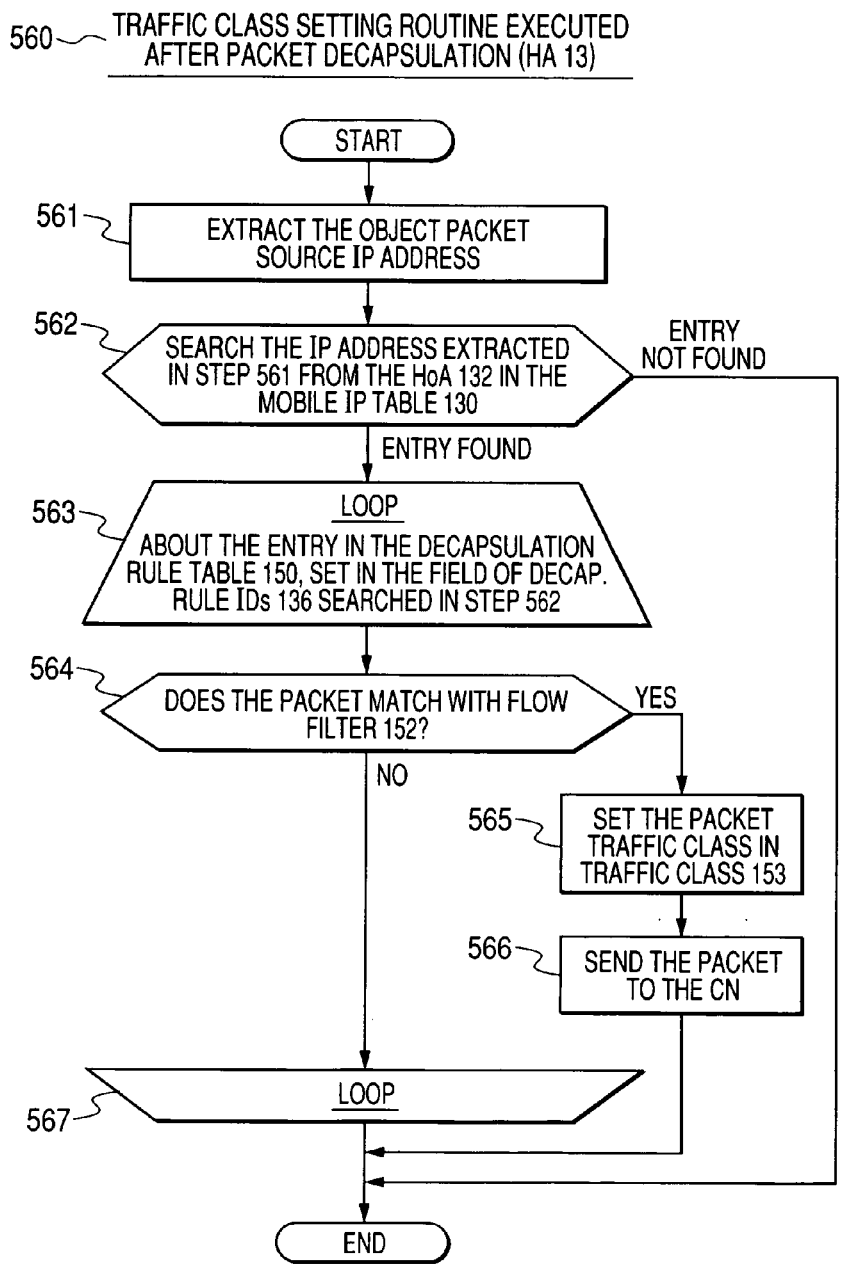
FIG. 15 is a diagram that describes a traffic class setting routine executed after packet decapsulation in the HA 13.

Next, there will be described the traffic class setting processing by the HA 13 (S237) executed after packet decapsulation with reference to FIG. 15. At first, the HA 13 extracts the packet sending source IP address (S561). Then, the HA 13 searches the IP address extracted in step 561 from the HoA 132 of the mobile IP table 130 (S562). If the object entry is not found, the HA 13 exits the processing. If the object entry is found, the HA 13 executes the processings in the loop steps 563 to 567 with respect to the entry in the decapsulation rule table 150, denoted in the field of Decap. Rule IDs 136 of the entry searched in step 562. At first, the HA 13 checks if the packet matches with the Flow Filter 152 (S564). If not matching, the HA 13 exits the processing with respect to the decapsulation rule. If matching, the HA 13 sets the packet traffic class in the field of Traffic Class 153 (S565), then sends the packet to the object unit (S567). After this, the HA 13 terminates the processings in the loop steps 563 to 567.

Figure 16:
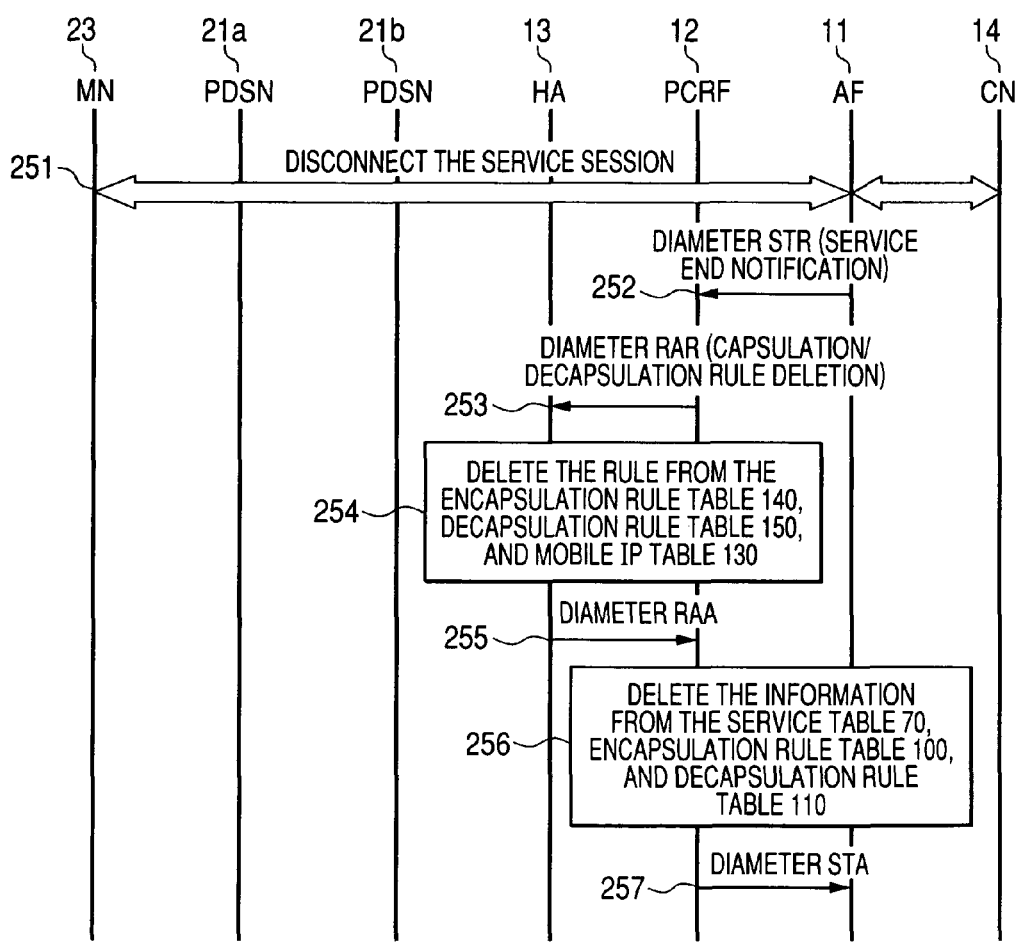
FIG. 16 is a diagram that describes a sequence of service session disconnection in the first embodiment.

Next, there will be described the service session ending processing with reference to FIG. 16. At first, the MN 23 terminates the service session with the CN 14 through the AF 11 (S251). The AF 11 then sends a diameter STR to the PCRF 12 (S252) to notify the termination of the service session. The PCRF 12 then sends a diameter RAR to the HA 13 (S253) to delete the encapsulation/decapsulation rule related to the service. The HA 13 also deletes the subject rule from the encapsulation rule table 140, the decapsulation rule table 150, and the mobile IP table 130 respectively (S254) and returns a diameter RAA to the PCRF 12 (S255). The PCRF 12 then deletes the related information from the service table 70, the encapsulation rule table 100, and the decapsulation rule table 110 (S256), then returns a diameter STA to the AF 11 (S257). Due to the execution of the above procedure, the related entries are deleted from the PCRF 12 and the HA 13 when the service session is disconnected.

Figure 17:
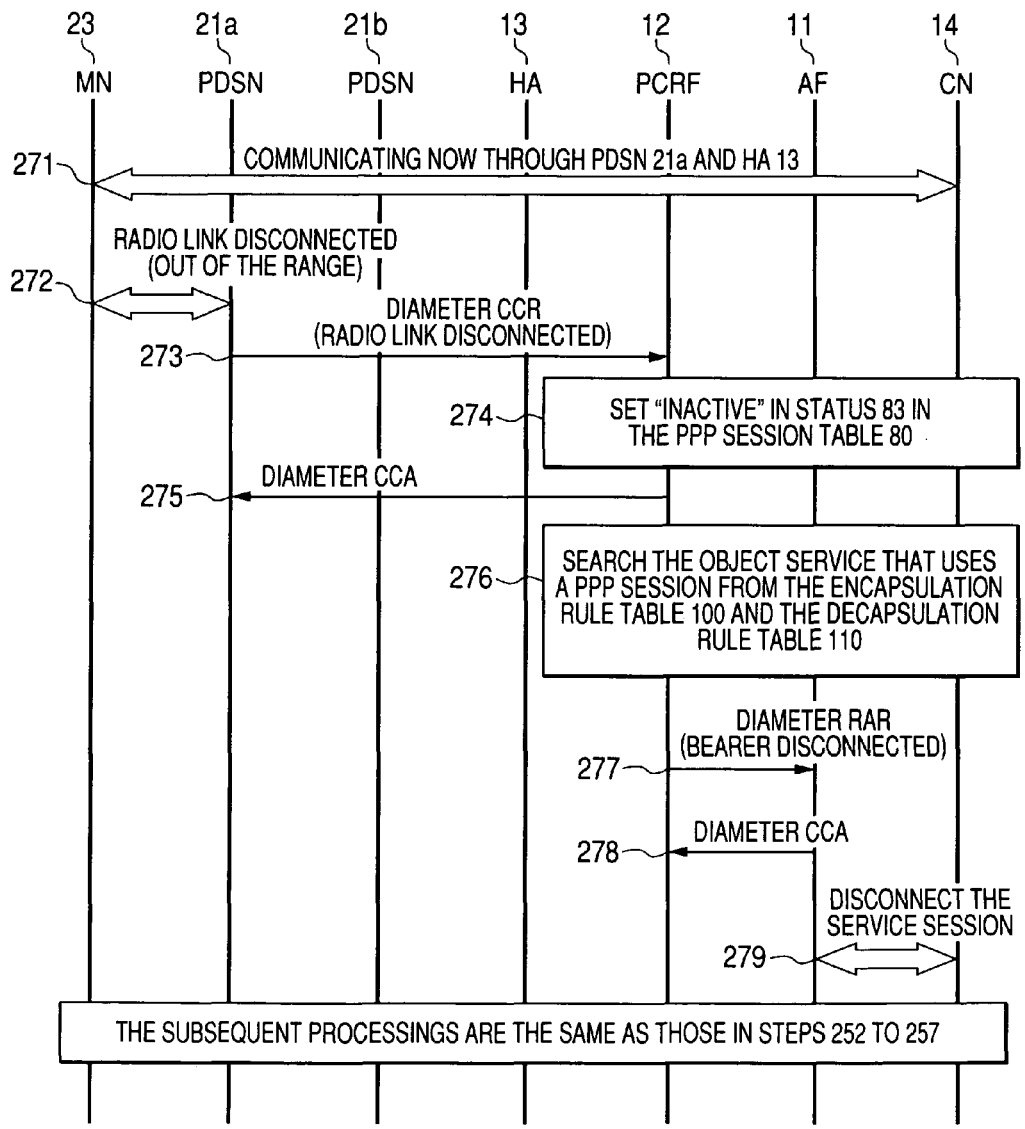
FIG. 17 is a diagram that describes a sequence of radio link disconnection executed in the MN 23 in the first embodiment.

FIG. 17 shows a sequence required when the radio link of the MN 23 is disconnected during a packet communication between the MN 23 and the CN 14. It is premised here that while the MN 23 and the CN 14 are communicating through the PDSN 21*a* and the HA 13 (S271), the MN 23 moves out of the communication range, thereby it is disconnected from the current radio link (S272). Upon sensing the disconnection of the MN 23 from the radio link, the PDSN 21*a* sets "inactive" in the field of the Status 423*e* in the PPP session table 420 and sends a diameter CCR to the PCRF 12 (S273). The PCRF 12 then sets "inactive" in the field of the Status 83*f* in the PPP session table 80 (S274) and returns a diameter CCA to the PDSN 21*a* (S275). Furthermore, the PCRF 12 searches the object service that uses the PPP session set for "inactive" in step 274 from the encapsulation rule table 100 and the decapsulation rule table 110 (S276) respectively. Then, the PCRF 12 sends a diameter RAR to the AF 11 (S277) to notify the disconnection of the service from the radio link. The AF 11 then returns a diameter RAA to the PCRF 12 (S278) and disconnects the service session (S279). The subsequent processings are the same as those in the steps 252 to 257 shown in FIG. 16. As described above, due to the execution of the above procedures, the resources in the AF 11, PCRF 12, HA 13, and CN 14 are released immediately when the radio link is disconnected.

Figure 18:
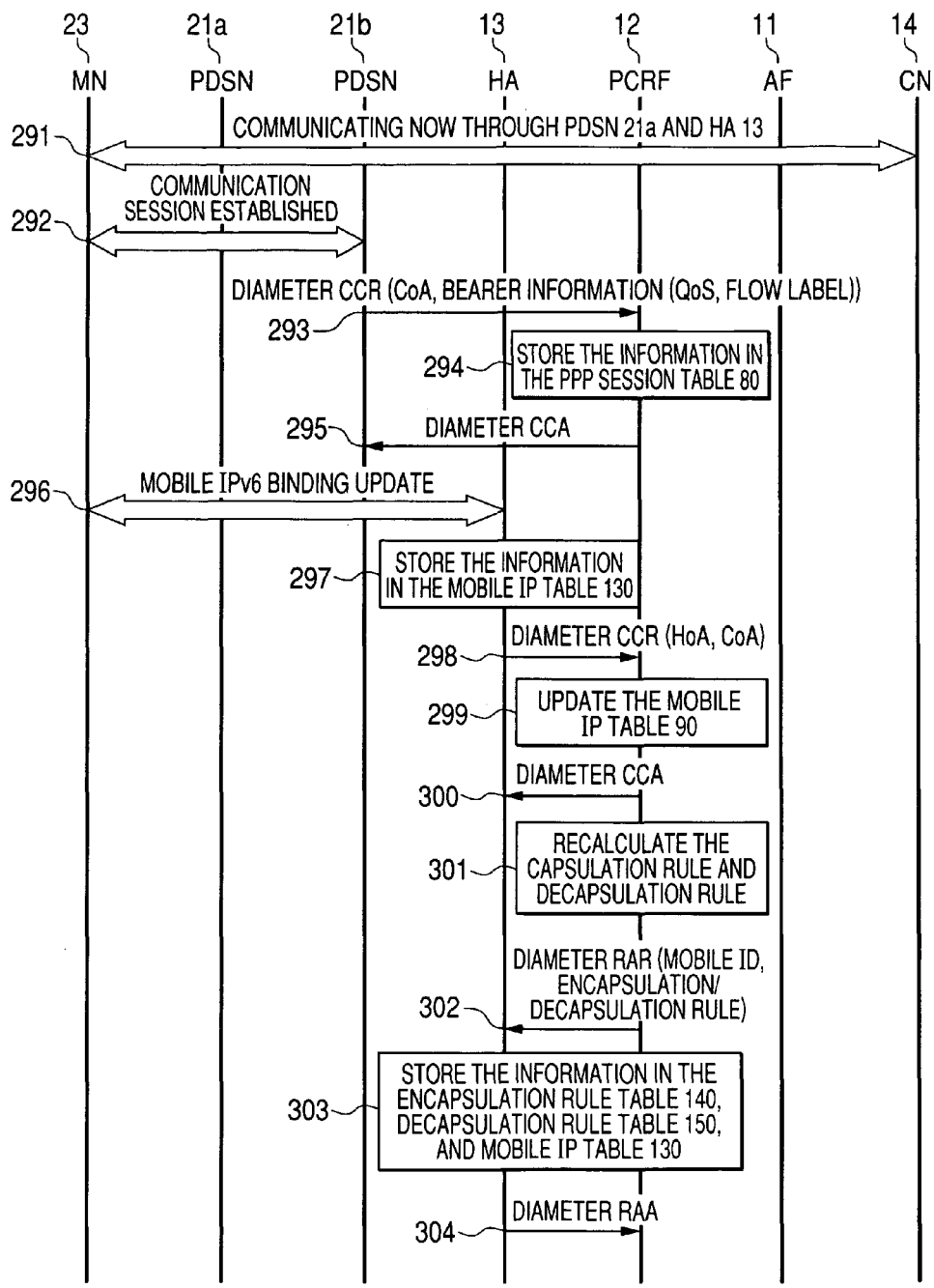
FIG. 18 is a diagram that describes a sequence of moving of the MN 23 in the first embodiment.

FIG. 18 shows a processing required when the MN 23 moves from the PDSN 21*a* to the PDSN 21*b* during a packet communication with the CN 14. It is premised here that the MN 23 and the CN 14 are communicating with each other through the PDSN 21*a* and the HA 13 (S291). Then, the MN 23 senses the radio link of the EV-D0 RAN 22*b* and establishes a PPP session with respect to the PDSN 21*b* and sets a bearer and a TFT respectively (S292). In this step, the PPP session table 420 is set in the PDSN 21*b*. After this, the PDSN 21*b* sends a diameter CCR to the PCRF 12 (S293) to notify the IP address (CoA) assigned to the object terminal and the information of the bearer established by the terminal. The PCRF 12 then stores the notified information in the PPP session table 80 (S294) and returns a diameter CCA to the PDSN 21*b* (S295).

After this, the MN 23 registers the binding information of both the HoA and CoA in the HA 13 (S296). The HA 13 then updates the information in the mobile IP table 130 (S297) and sends a diameter CCR to the PCRF 12 to notify the updating. The PCRF 12 then updates the mobile IP table 90 (S299) and returns a diameter CCA to the HA 13 (S230). Upon the updating of the mobile IP table 90, the PCRF 12 recalculates both the encapsulation rule and the decapsulation rule (S301).

Figure 19:
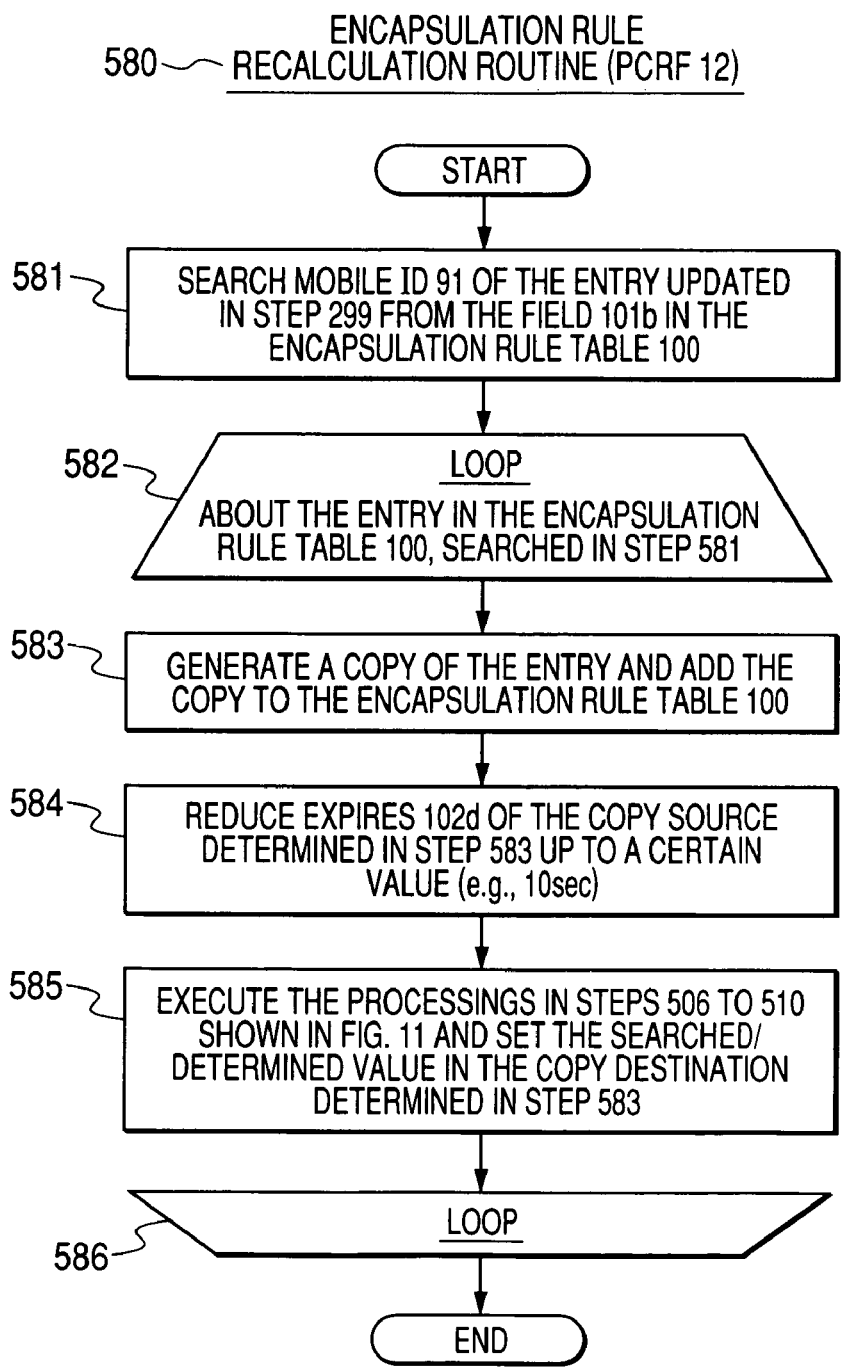
FIG. 19 is a sequence of capsulation rule recalculation executed in the PCRF 12.

Next, there will be described how the encapsulation rule of the PCRF 12 is to be recalculated in detail with reference to FIG. 19. At first, the PCRF 12 searches the mobile ID 91 of the entry updated in step 299 from the field 101*b* in the encapsulation rule table 100 (S581). Then, the PCRF 12 executes the processings in loop steps 582 to 586 with respect to the entry searched in step 581. At first, the PCRF 12 creates a copy of the entry and adds the copy to the encapsulation rule table 100 (S583). Then, the PCRF 12 reduces the expiration (Expires 102*d*) of the copy source entry (S583) up to a certain value (e.g., 10 sec) (S584). The PCRF 12 then executes the processings in steps 506 to 510 shown in FIG. 11 and sets the searched/determined value in the copy destination entry in step 583 (S585). This completes the description of the capsulation rule recalculation. The same calculation procedure is also applied to the decapsulation rule recalculation. As shown in step 584, if the old entry is held for a certain period, the HA 13 comes to sends packets to both the new and old networks temporarily. This processing is needed to enable the MN 23 to send/receive packets with no breaks while moving from a network to another.

Now, return to FIG. 18 to continue the description of the above sequence. The PCRF 12 sends a diameter RAR to the HA 13 (S302) to set the rule recalculated in step 301. The HA 13 then sets the notified rule in the encapsulation rule table 140, the decapsulation rule table 150, and the mobile IP table 130 respectively (S303) and returns a diameter RAA to the PCRF 12 (S304).

Second Embodiment

In this second embodiment, it is premised that a network (PCRF 12) takes the initiative in setting the subject RAN communication channel.

The network configuration in this second embodiment is the same as that in the first embodiment. Except for the QoS profile table 440 shown in FIG. 25 provided in the PCRF 12, the system configuration is also the same as that in the first embodiment.

The QoS profile table 440 shown in FIG. 25 manages the QoS profile that each terminal can use in its communication range. The PCRF 12, provided with this table, comes to be able to determine QoS parameters appropriately to the object network condition upon starting a service. The QoS profile table 440 consists of fields of PPP Session ID 441 used to identify each PDSN and each PPP session uniquely, Terminal IP Address 442, and Bearer Information 443. The Bearer Information 443 consists of fields of Usage 443*a* (bearer usage), Priority 443*b* (priority level), and Bandwidth 443*c* (secured bandwidth).

Figure 20:
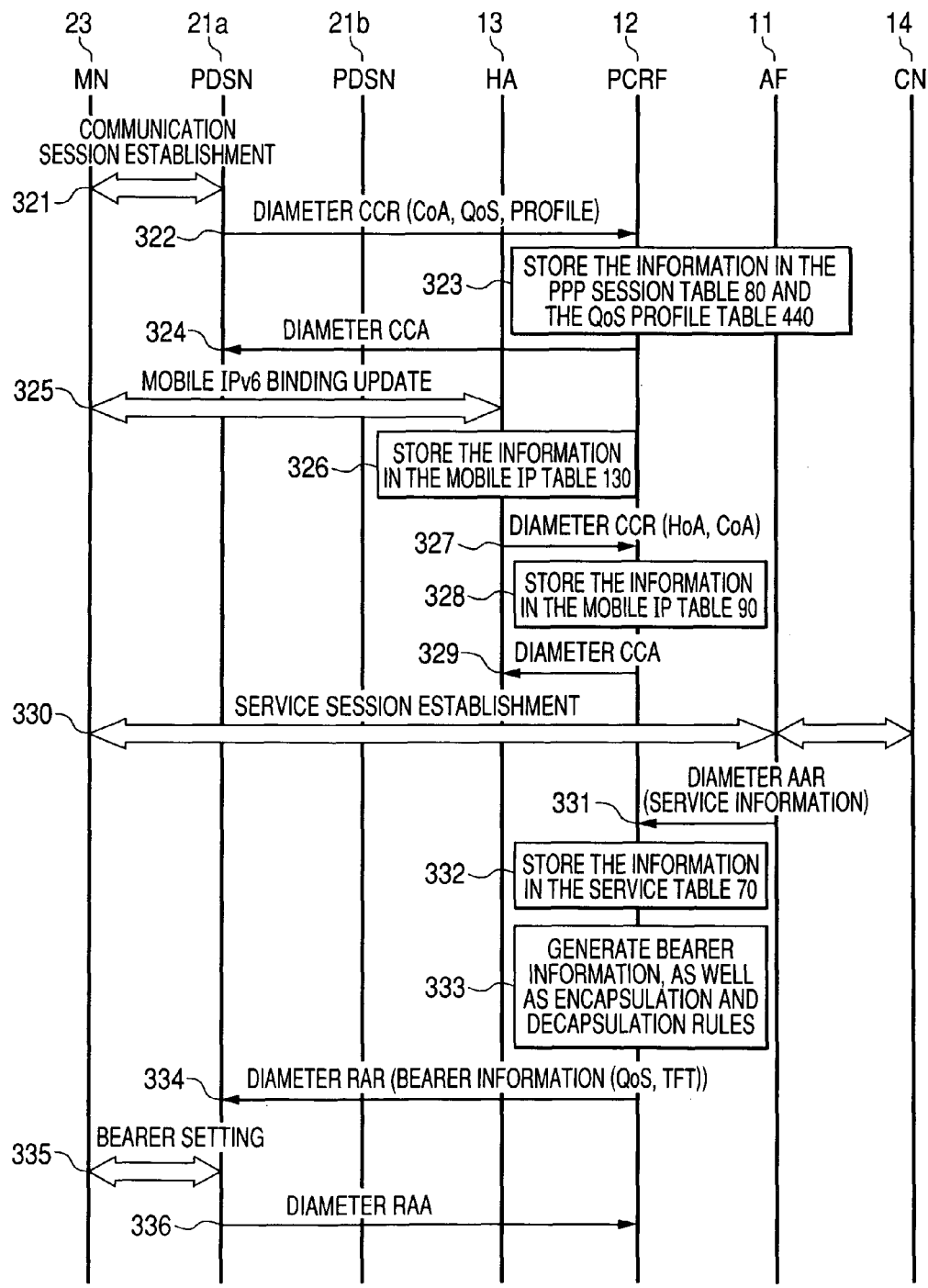
FIG. 20 is a sequence of terminal connection/service session establishment in the second embodiment.

Next, there will be described the sequence of terminal connection/service session establishment in the second embodiment with reference to FIGS. 20 and 21. The processings in steps 321 to 329 are executed in a sequence when the MN 23 is connected to the EV-D0 RAN 22*a*. At first, the MN 23 connects the EV-D0 RAN 22*a* and establishes a PPP session to communicate with the PDSN 21*a* (S321). In this second embodiment, the MN 23 does not set any media (voice/video) communication bearer at this time. Consequently, in the PPP session table 420 of the PDSN 21*a* are just set information in the fields of PPP Session ID 421 and Terminal IP Address 422.

After this, the PDSN 21*a* sends a diameter CCR to the PCRF 12 (S322) to notify the IP address (CoA) assigned to the object terminal and the QoS profile of the bearer that the MN 23 can use in the visited network 2. The PCRF 12 stores the notified information in the PPP session table 80 and the QoS profile table 440 (S323) and returns a diameter CCA to the PDSN 21*a* (S324).

Then, the MN 23 registers the binding information of both the HoA and the CoA with respect to the HA 13 (S325). The HA 13 stores this information in the mobile IP table 130 (S326) and sends a diameter CCR to the PCRF 12 (S327). The PCRF 12 stores the information notified from the HA 13 in the mobile IP table 90 (S328) and returns a diameter CCA to the HA 13 (S329).

The processings in steps 330 to 340 are executed in a sequence when a service session is established. At first, the MN 23 establishes a service session to communicate with the CN 14 through the AF 11 (S330). The AF 11 notifies the PCRF 12 of the service information extracted from the service control signal (SIP/SDP, etc.) (S331). The PCRF 12 stores the notified information in the service table 70 (S332), then selects/creates bearer information (QoS parameters and TFT) used for the object service and generates the encapsulation/decapsulation rule (S333). The bearer information may be selected from those in the QoS profile stored in the QoS profile table 440 in step 323 or the PCRF 12 may determine new parameters according to the service information. If the bearer to be used in an object service is to be selected from the QoS profile table 440, the processing can omit part of the parameter determining processing executed in the PCRF 12. The encapsulation rule and decapsulation rule are the same as those described in the first embodiment shown in FIGS. 11 and 12.

After this, the PCRF 12 sends a diameter RAR to the PDSN 21*a* (S334) to notify the bearer information selected/determined in step 333 to the PDSN 21*a*. The PDSN 21*a* then sets the notified information in the PPP session table 420. Upon establishing the bearer, the PDSN 21*a* returns a diameter RAR to the PCRF 12 as a response (S336). The above procedure is effective to dynamically set bearer information appropriately to the object service at the time of service session establishment.

Figure 21:
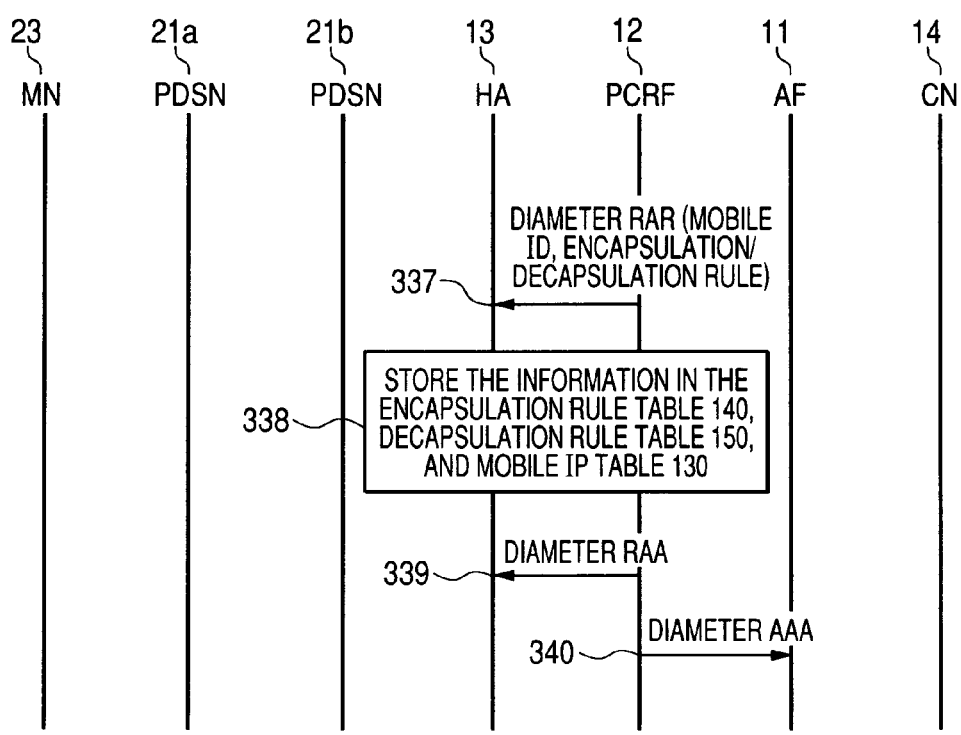
FIG. 21 is a sequence of terminal connection/service session establishment in the second embodiment (continued from FIG. 20)

Next, there will further be described the above sequence continuously with reference to FIG. 21. The PCRF 12 sends a diameter RAR to the HA 13 (S337) and sets the encapsulation/decapsulation rule generated in step 333. The HA 13 then stores the generated rule in the encapsulation rule table 140, the decapsulation rule table 150, and the mobile IP table 130 respectively (S338) and returns a diameter RAA to the PCRF 12 as a response (S339). The PCRF 12 then sends a diameter AAA to the AF 11 to response to the diameter AAR received in step 331 (S340).

Figure 22:
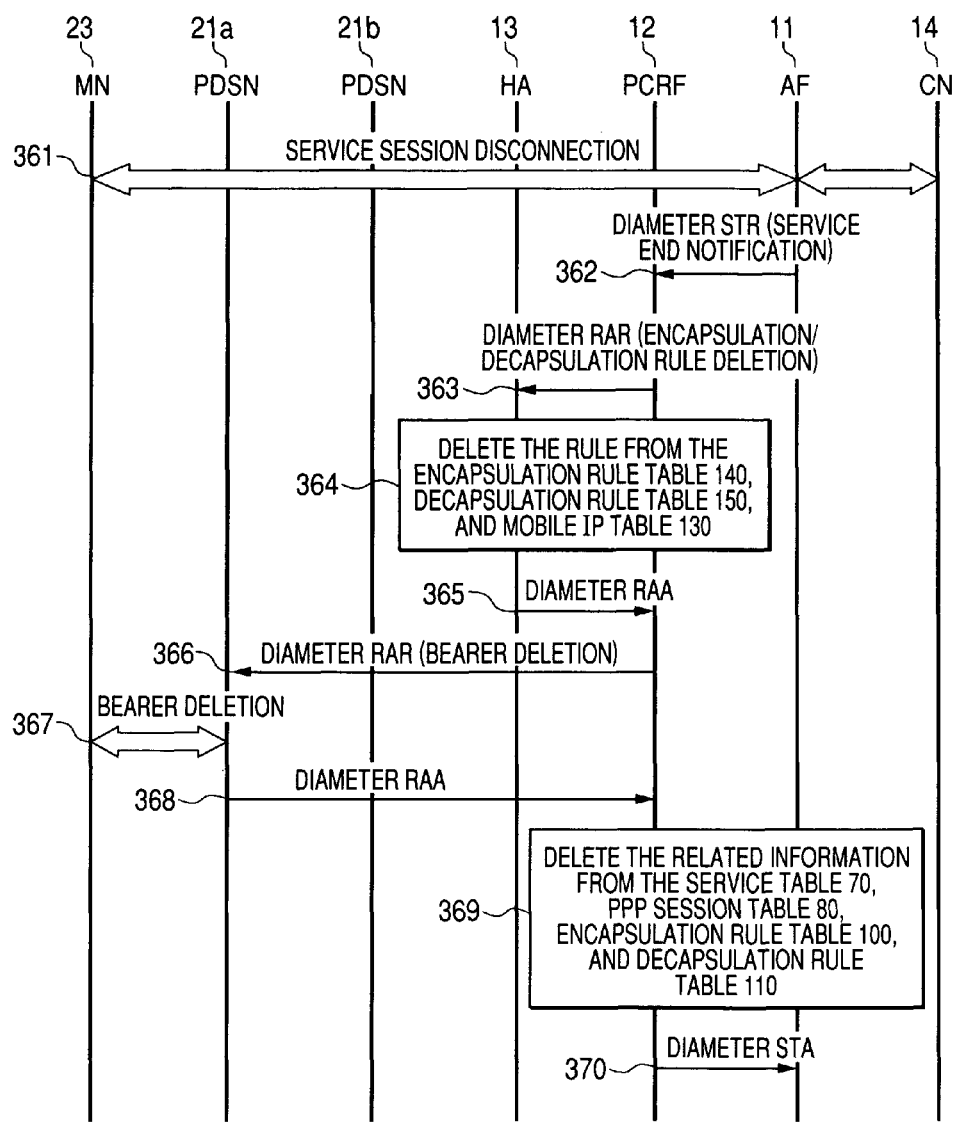
FIG. 22 is a sequence of service session disconnection in the second embodiment.

FIG. 22 shows a procedure that terminates a service session in the second embodiment. At first, the MN 23 terminates the service session with respect to the CN 14 through the AF 11 (S361). The AF 11 then sends a diameter STR to the PCRF 12 (S362) to notify the termination of the service session thereto. The PCRF 12 then returns a diameter RAR to the HA 13 (S363) and deletes the encapsulation/decapsulation rule related to the service. The HA 13 also deletes the subject rule from the encapsulation rule table 140, decapsulation rule table 150, and mobile IP table 130 respectively (S364) and returns a diameter RAA to the PDSN 21a (S365). The PCRF 12 then sends a diameter RAR to the PDSN 21a (S366) to request the deletion of the bearer to the PDSN 21a. The PDSN 21a then deletes the requested bearer (S367) and deletes the bearer information from the PPP session table 420, then returns a diameter RAA to the PCRF 12 as a response (S368). The PCRF 12 then deletes related information from the service table 70, PPP session table 80, encapsulation rule table 100, and decapsulation rule table 110 respectively (S369) and returns a diameter STA to the FA 11 as a response (S370). Execution of the above procedure is effective to release the bearer and delete the related entries from the PCRF 12, HA 13, and PDSN 21a upon terminating the service session.

In this second embodiment, because each bearer is set dynamically when a service session is established, the embodiment can cope flexibly with such a case in which one of QoS parameters and TFTs are predetermined yet.

What is claimed is:

1. A communication system, comprising:
    a terminal;
    a communication apparatus that transmits a care of address of the terminal and channel information, the channel information including a plurality of correspondences between flow labels and QoS information of a plurality of channels established between the communication apparatus and the terminal;
    an application server that, upon establishing a service session for a flow between the terminal and a correspondent node, extracts session information of the service session and transmits the session information including a flow ID, flow filter information to identify the flow that includes a home address of the terminal, and QoS information of the flow;
    a server that receives and holds binding information including the home address and the care of address of the terminal from the terminal, and, upon receiving a packet that includes the home address of the terminal as a destination address from the correspondent node, transmits the received packet to the terminal encapsulated with the care of address of the terminal based on the binding information; and
    a control apparatus connected to the server, the control apparatus receiving the session information transmitted from the application server and holding the received session information with a service table, receiving the channel information transmitted from the communication apparatus and holding the received channel information with a session table, and receiving the binding information from the server, the control apparatus specifying the plurality of channels associated with the terminal within the session table by referring to the home address of the terminal in the service table, the binding information, and the care of address of the terminal in the session table, selecting a channel for the flow from the specified plurality of channels by comparing the QoS information of the specified plurality of channels in the channel information and the QoS information of the flow in the session information using the service table and the session table, the control apparatus transmitting correspondence information between the care of address of the terminal, the flow filter information, and a flow label of the selected channel to the server,
    wherein the server receives the correspondence information transmitted by the control apparatus, identifies a received packet based on the flow filter information transmitted from the control apparatus and information within the received packet, encapsulates the received packet with the care of address of the terminal, adds the flow label of the selected channel to a header region of the encapsulated packet based on the correspondence information transmitted from the control apparatus, and transmits the encapsulated packet to the communication apparatus,
    wherein the communication apparatus receives the encapsulated packet from the server and, based on the flow label added to the encapsulated packet by the server, transfers the encapsulated packet to the terminal, and
    wherein the terminal receives the encapsulated packet from the communication apparatus.

2. The communication system according to claim 1, wherein the control apparatus uses the service table and the session table to refer to both QoS information of a new channel to be established between the terminal and a new communication apparatus and QoS information of a flow received by the server upon the terminal moving from an area of the communication apparatus to a different area of the new communication apparatus during a communication session so as to assign a new flow label of the new channel to the flow filter information and notifies the server of correspondence information between the new flow label and the flow filter information; and
    wherein the server transfers received packets of the flow to both the communication apparatus and the new communication apparatus for a certain period.

3. The communication system according to claim 1, wherein the server encapsulates the received packet using an IPv6 header and sets the flow label in the Flow Label or Traffic Class field of the IPv6 header.

4. The communication system according to claim 1, wherein the QoS information of the flow is an identifier assigned to at least any one of a service name, a priority level, a secured bandwidth, an allowable delay, or jitter or to a combination of at least any two of those items.

* * * * *